United States Patent
Gurelli et al.

(10) Patent No.: US 11,984,953 B2
(45) Date of Patent: May 14, 2024

(54) ORBITAL ANGULAR MOMENTUM TRANSMISSION AND RECEPTION USING INTELLIGENT REFLECTING SURFACES

(71) Applicant: QUALCOMM Incorporated, San Diego, CA (US)

(72) Inventors: Mehmet Izzet Gurelli, San Diego, CA (US); Qiang Wu, San Diego, CA (US); Junyi Li, Fairless Hills, PA (US); Tao Luo, San Diego, CA (US); Ozge Koymen, Princeton, NJ (US); Navid Abedini, Basking Ridge, NJ (US); Mohammad Ali Tassoudji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 23 days.

(21) Appl. No.: 17/685,264

(22) Filed: Mar. 2, 2022

(65) Prior Publication Data
US 2023/0283336 A1    Sep. 7, 2023

(51) Int. Cl.
*H04B 7/06*        (2006.01)
*H04B 7/0456*   (2017.01)

(52) U.S. Cl.
CPC ......... *H04B 7/0617* (2013.01); *H04B 7/0456* (2013.01); *H04B 7/0634* (2013.01)

(58) Field of Classification Search
CPC .. H04B 7/0617; H04B 7/0456; H04B 7/0634; H04B 7/04026
See application file for complete search history.

(56) References Cited

U.S. PATENT DOCUMENTS

| | | | |
|---|---|---|---|
| 10,103,799 B2* | 10/2018 | Luddy | H04J 11/00 |
| 10,914,959 B2* | 2/2021 | Li | H04L 5/04 |
| 11,336,008 B2* | 5/2022 | Hirabe | H01Q 3/16 |

(Continued)

OTHER PUBLICATIONS

International Search Report and Written Opinion—PCT/US2023/062114—ISA/EPO—dated May 17, 2023.

(Continued)

*Primary Examiner* — Vineeta S Panwalkar
(74) *Attorney, Agent, or Firm* — Holland & Hart LLP/Qualcomm Incorporated

(57) ABSTRACT

Aspects of the present disclosure relate to utilizing an intelligent reflecting surface (IRS), a tracking algorithm, or both, to receive, calibrate, and maintain orbital angular momentum (OAM) signaling between wireless devices. The present disclosure describes a first wireless device transmitting spatial-multiple input-multiple output (MIMO) beams to the IRS such that reflected waves from the IRS form a spatial mixture of OAM modes. The IRS may reflect such OAM modes to a second wireless device for subsequent reflection (e.g., a second IRS), reception, calibration, and optimization. For example, the second wireless device may perform pattern recognition of the concentric OAM modes (e.g., by estimating ellipse geometry) to determine the modes of the OAM signaling. The second wireless device may also perform decorrelation, where small perturbations to the elliptical OAM geometry allow the second wireless device to perform one or more optimization techniques related to the OAM signaling.

26 Claims, 14 Drawing Sheets

(56) References Cited

U.S. PATENT DOCUMENTS

2022/0393930 A1* 12/2022 Nasiri Khormuji .......................... H04L 27/3411

OTHER PUBLICATIONS

Wang Y., et al., "IRS Aided OAM-MIMO Communication", 2021 International Symposium on Antennas and Propagation (ISAP), Taiwan Microwave Association, Oct. 19, 2021, XP034029730, 2 pages.
Yang Z., et al., "Reconfigurable Intelligent Surface Based Orbital Angular Momentum: Architecture, Opportunities, and Challenges", IEEE Wireless Communications, Coordinated Science Laboratory, Dept. Electrical and Computer Engineering, University of Illinois at Urbana-Champaign, US, vol. 28, No. 6, Dec. 1, 2021, XP011898279, pp. 132-137, abstract p. 133-p. 135 figures 1, 2, 4.

* cited by examiner

ORBITAL ANGULAR MOMENTUM TRANSMISSION AND RECEPTION USING INTELLIGENT REFLECTING SURFACES

FIELD OF TECHNOLOGY

The following relates to wireless communications, including orbital angular momentum transmission and reception using intelligent reflecting surfaces.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (SG) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support orbital angular momentum transmission and reception using intelligent reflecting surfaces. Aspects of the present disclosure relate to utilizing an intelligent reflecting surface (IRS), a tracking algorithm, or both, to receive, calibrate, and maintain orbital angular momentum (OAM) signaling between wireless devices. The present disclosure describes a first wireless device transmitting spatial-multiple input-multiple output (MIMO) beams to the IRS such that the incident waves at the IRS form concentric OAM modes. The IRS may reflect such OAM modes to a second wireless device for reception, calibration, and optimization. For example, the second wireless device may perform pattern recognition of the concentric OAM modes (e.g., by estimating ellipse geometry) to determine the modes of the OAM signaling. The second wireless device may also perform decorrelation, where small perturbations to the elliptical OAM geometry (e.g., by adjusting one or more parameters at the IRS) allow the second wireless device to perform one or more optimization techniques related to the OAM signaling. Lastly, the second wireless device may transmit feedback to the first wireless device to optimize one or more transmission parameters, such as precoding or gross error correction. Such perturbations may continue throughout communications to accomplish tracking, or small periodic measurements to ensure the OAM signals maintain high power and orthogonality. Additionally, by leveraging IRS as intermediate nodes to reflect OAM transmissions in wireless communications systems, extended OAM signaling (e.g., in dense environments) may be realized.

A method for wireless communications at a first wireless device is described. The method may include receiving, using one or more antenna elements associated with the first wireless device, a set of orbital angular momentum signals via a set of antenna elements of an IRS, transmitting a feedback message based on the set of orbital angular momentum signals, the feedback message indicating one or more parameter adjustments for subsequent orbital angular momentum communications between the first wireless device and a second wireless device, the one or more parameter adjustments based on one or more measurements associated with the set of orbital angular momentum signals by the first wireless device, and communicating with the second wireless device according to the one or more parameter adjustments based on the feedback message.

An apparatus for wireless communications is described. The apparatus may include a memory, a transceiver, and at least one processor of a first wireless device, the at least one processor coupled with the memory and the transceiver. The at least one processor may be configured to cause the apparatus to receive a set of orbital angular momentum signals via a set of antenna elements of an IRS using one or more antenna elements associated with the first wireless device, transmit a feedback message based on the set of orbital angular momentum signals, the feedback message indicating one or more parameter adjustments for subsequent orbital angular momentum communications between the first wireless device and a second wireless device, the one or more parameter adjustments based on one or more measurements associated with the set of orbital angular momentum signals by the first wireless device, and communicate with the second wireless device according to the one or more parameter adjustments based on the feedback message.

Another apparatus for wireless communications at a first wireless device is described. The apparatus may include means for receiving, using one or more antenna elements associated with the first wireless device, a set of orbital angular momentum signals via a set of antenna elements of an IRS, means for transmitting a feedback message based on the set of orbital angular momentum signals, the feedback message indicating one or more parameter adjustments for subsequent orbital angular momentum communications between the first wireless device and a second wireless device, the one or more parameter adjustments based on one or more measurements associated with the set of orbital angular momentum signals by the first wireless device, and means for communicating with the second wireless device according to the one or more parameter adjustments based on the feedback message.

A non-transitory computer-readable medium storing code for wireless communications at a first wireless device is described. The code may include instructions executable by a processor to receive a set of orbital angular momentum signals via a set of antenna elements of an IRS using one or more antenna elements associated with the first wireless device, transmit a feedback message based on the set of orbital angular momentum signals, the feedback message indicating one or more parameter adjustments for subsequent orbital angular momentum communications between the first wireless device and a second wireless device, the one or more parameter adjustments based on one or more measurements associated with the set of orbital angular momentum signals by the first wireless device, and communicate with the second wireless device according to the one or more parameter adjustments based on the feedback message.

Some examples of the method, apparatuses, and non-transitory computer-readable medium described herein may further include operations, features, means, or instructions for receiving an orbital angular momentum signal of the set of orbital angular momentum signals, the orbital angular momentum signal corresponding to a mode associated with the set of orbital angular momentum signals and estimating, from the orbital angular momentum signal, a set of parameters corresponding to the mode and the set of antenna elements of the IRS, where the one or more parameter adjustments may be based on the estimating.

In some examples of the method, apparatuses, and non-transitory computer-readable medium described herein, the set of parameters corresponds to a power density and an impinging phase pattern.

In some examples of the method, apparatuses, and non-transitory computer-readable medium described herein, estimating the set of parameters may include operations, features, means, or instructions for estimating, from the orbital angular momentum signal, a coarse power density mapping associated with the set of antenna elements of the IRS, assigning, to the set of antenna elements of the IRS, one or more subareas, each subarea including one or more antenna elements of the IRS, where each subarea includes one or more virtual focal points, the one or more virtual focal points based on the set of antenna elements, the mode, or both, and determining, via an estimation procedure, one or more boundaries associated with the mode based on the mode and the one or more antenna elements, the one or more boundaries corresponding to the set of antenna elements.

In some examples of the method, apparatuses, and non-transitory computer-readable medium described herein, the estimation procedure corresponds to an orthogonal cover code-based channel estimation procedure, activating one or more subareas, or both.

Some examples of the method, apparatuses, and non-transitory computer-readable medium described herein may further include operations, features, means, or instructions for estimating, from the orbital angular momentum signal, a coarse impinging signal phase mapping associated with the set of antenna elements of the IRS based on the one or more boundaries associated with the mode and assigning, to the one or more boundaries, a phase mapping, the phase mapping corresponding to a phase variation associated with the one or more boundaries.

In some examples of the method, apparatuses, and non-transitory computer-readable medium described herein, the phase mapping corresponds to a uniformly distributed phase mapping.

In some examples of the method, apparatuses, and non-transitory computer-readable medium described herein, the phase mapping corresponds to a swirled phase mapping.

Some examples of the method, apparatuses, and non-transitory computer-readable medium described herein may further include operations, features, means, or instructions for determining, for a set of segments of a surface associated with the one or more boundaries, a set of surface phases, the set of segments being associated with the set of antenna elements, the mode, and a set of antenna elements of the first wireless device, transmitting, via the feedback message, the set of surface phases, the set of surface phases associated with the set of antenna elements, the mode, and the set of antenna elements of the first wireless device, and receiving, at the set of antenna elements of the first wireless device, a beamformed orbital angular momentum signal based on the set of antenna elements, the feedback message, and the mode.

Some examples of the method, apparatuses, and non-transitory computer-readable medium described herein may further include operations, features, means, or instructions for determining, based on receiving the beamformed orbital angular momentum signal, one or more equalization factors associated with one or more discrete Fourier transform vectors, the one or more discrete Fourier transform vectors being associated with the mode.

Some examples of the method, apparatuses, and non-transitory computer-readable medium described herein may further include operations, features, means, or instructions for determining, from the set of segments, a second set of segments, where the second set of segments may be based on a swirl pattern associated with the mode and estimating, via the second set of segments, a swirl surface phase mapping based on the swirl pattern associated with the mode.

Some examples of the method, apparatuses, and non-transitory computer-readable medium described herein may further include operations, features, means, or instructions for determining a refined phase mapping, a refined power mapping, or both, based on receiving the beamformed orbital angular momentum signal.

Some examples of the method, apparatuses, and non-transitory computer-readable medium described herein may further include operations, features, means, or instructions for receiving a set of beamformed orbital angular momentum signals corresponding to the set of orbital angular momentum signals, each beamformed orbital angular momentum signal of the set of beamformed orbital angular momentum signals being associated with a mapping between a set of antenna elements of the IRS and a set of antenna elements of the first wireless device, one or more boundaries, and a mode, transmitting a second feedback message based on the set of beamformed orbital angular momentum signals, the second feedback message indicating a second set of parameter adjustments, the second set of parameter adjustments based on an overlap between the one or more boundaries, and communicating with the second wireless device according to the second set of parameter adjustments based on the second feedback message.

In some examples of the method, apparatuses, and non-transitory computer-readable medium described herein, the second set of parameter adjustments includes an average of overlapping boundaries, an average of gaps between boundaries, or both.

Some examples of the method, apparatuses, and non-transitory computer-readable medium described herein may further include operations, features, means, or instructions for transmitting, in the second feedback message, one or more incremental adjustments to surface phases associated with the set of beamformed orbital angular momentum signals and determining the overlap between one or more boundaries associated with the set of beamformed orbital angular momentum signals based on the one or more incremental adjustments.

Some examples of the method, apparatuses, and non-transitory computer-readable medium described herein may further include operations, features, means, or instructions for determining a complex channel matrix associated with the set of beamformed orbital angular momentum signals based on the one or more incremental adjustments, where the complex channel matrix includes channel coefficients associated with the set of beamformed orbital angular momentum signals.

In some examples of the method, apparatuses, and non-transitory computer-readable medium described herein, the one or more incremental adjustments may be based on an online gradient-based procedure.

Some examples of the method, apparatuses, and non-transitory computer-readable medium described herein may further include operations, features, means, or instructions for transmitting a third feedback message based on communicating with the second wireless device according to the second set of parameter adjustments, the third feedback message indicating one or more modem-level precoder values.

In some examples of the method, apparatuses, and non-transitory computer-readable medium described herein, the one or more modem-level precoder values may be based on one or more codebooks.

A method for wireless communications at a second wireless device is described. The method may include transmitting, using one or more antenna elements associated with the second wireless device, one or more signals associated with a set of orbital angular momentum modes via reflection by a set of antenna elements of an IRS, receiving a feedback message from a first wireless device based on the set of orbital angular momentum modes, the feedback message indicating one or more parameter adjustments for subsequent orbital angular momentum communications between the first wireless device and the second wireless device, the one or more parameter adjustments based on one or more measurements associated with the set of orbital angular momentum modes, and communicating with the first wireless device according to the one or more parameter adjustments based on the feedback message.

An apparatus for wireless communications is described. The apparatus may include a memory, a transceiver, and at least one processor of a second wireless device. The at least one processor may be configured to cause the apparatus to transmit, using one or more antenna elements associated with the second wireless device, one or more signals associated with a set of orbital angular momentum modes via reflection by a set of antenna elements of an IRS, receive a feedback message from a first wireless device based on the set of orbital angular momentum modes, the feedback message indicating one or more parameter adjustments for subsequent orbital angular momentum communications between the first wireless device and the second wireless device, the one or more parameter adjustments based on one or more measurements associated with the set of orbital angular momentum modes, and communicate with the first wireless device according to the one or more parameter adjustments based on the feedback message.

Another apparatus for wireless communications at a second wireless device is described. The apparatus may include means for transmitting, using one or more antenna elements associated with the second wireless device, one or more signals associated with a set of orbital angular momentum modes via reflection by a set of antenna elements of an IRS, means for receiving a feedback message from a first wireless device based on the set of orbital angular momentum modes, the feedback message indicating one or more parameter adjustments for subsequent orbital angular momentum communications between the first wireless device and the second wireless device, the one or more parameter adjustments based on one or more measurements associated with the set of orbital angular momentum modes, and means for communicating with the first wireless device according to the one or more parameter adjustments based on the feedback message.

A non-transitory computer-readable medium storing code for wireless communications at a second wireless device is described. The code may include instructions executable by a processor to transmit, using one or more antenna elements associated with the second wireless device, one or more signals associated with a set of orbital angular momentum modes via reflection by a set of antenna elements of an IRS, receive a feedback message from a first wireless device based on the set of orbital angular momentum modes, the feedback message indicating one or more parameter adjustments for subsequent orbital angular momentum communications between the first wireless device and the second wireless device, the one or more parameter adjustments based on one or more measurements associated with the set of orbital angular momentum modes, and communicate with the first wireless device according to the one or more parameter adjustments based on the feedback message.

In some examples of the method, apparatuses, and non-transitory computer-readable medium described herein, transmitting the one or more signals may include operations, features, means, or instructions for transmitting a first beamformed signal associated with a first mode of the set of orbital angular momentum modes and transmitting a second beamformed signal associated with a second mode of the set of orbital angular momentum modes via a second set of antenna elements of the intelligent reflecting surface using the one or more antenna elements.

In some examples of the method, apparatuses, and non-transitory computer-readable medium described herein, the first and second modes may be different.

In some examples of the method, apparatuses, and non-transitory computer-readable medium described herein, the first and second modes may be associated with non-overlapping beams impinging on the IRS associated with the second wireless device.

In some examples of the method, apparatuses, and non-transitory computer-readable medium described herein, receiving the feedback message may include operations, features, means, or instructions for receiving, via the feedback message, an indication of a precoder, an indication of major errors, or both, the indication of the precoder and the indication of major errors associated with one or more sets of antenna elements of the first wireless device and one or more modes of the set of orbital angular momentum modes.

In some examples of the method, apparatuses, and non-transitory computer-readable medium described herein, communicating with the first wireless device may include operations, features, means, or instructions for transmitting a beamformed orbital angular momentum signal based on the indication of the precoder, the indication of major errors, or both.

Some examples of the method, apparatuses, and non-transitory computer-readable medium described herein may further include operations, features, means, or instructions for receiving a third feedback message based on communicating with the first wireless device according to the second set of parameter adjustments, the third feedback message indicating one or more modem-level precoder values.

DETAILED DESCRIPTION

Figure 1:
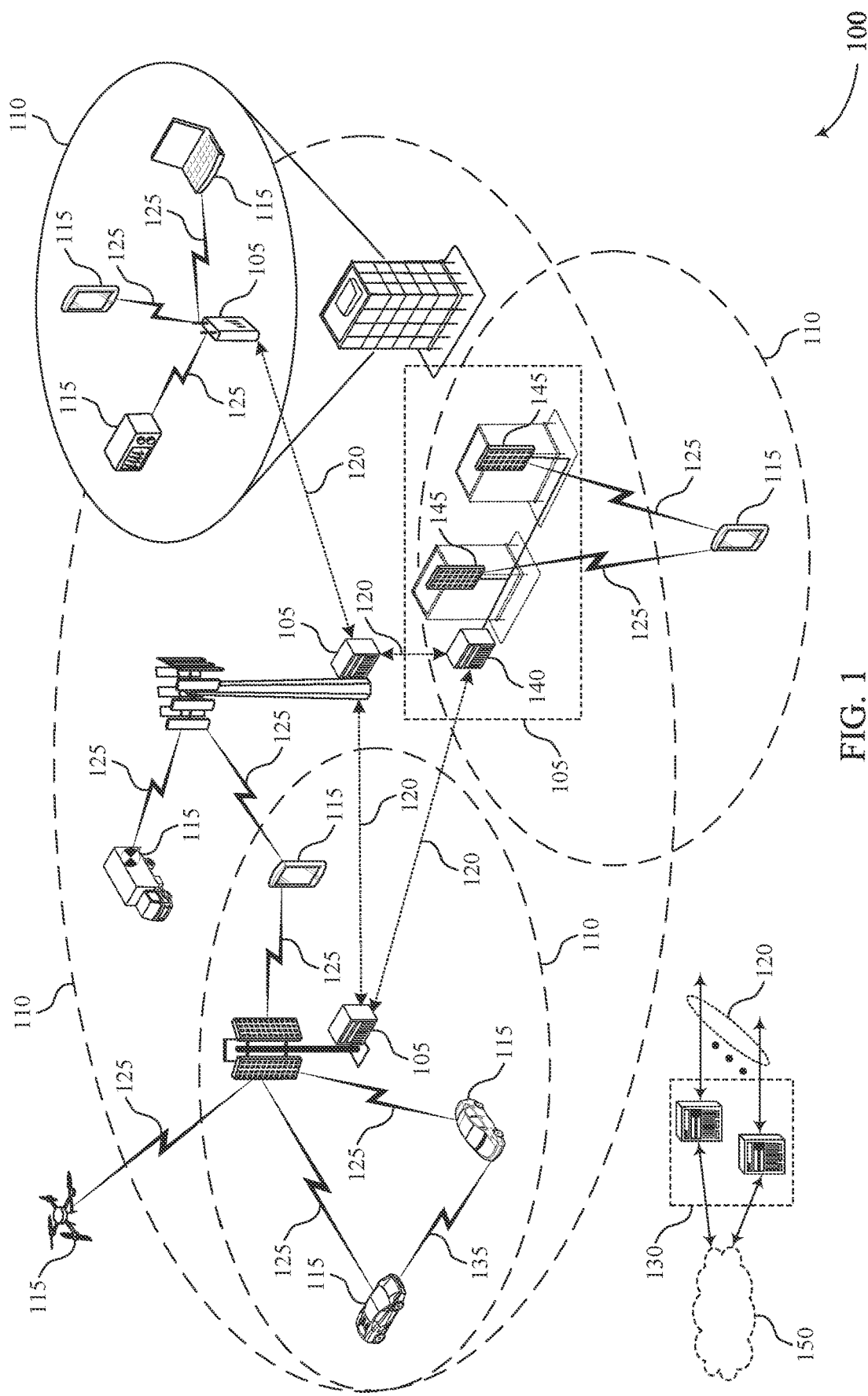
FIG. 1 illustrates an example of a wireless communications system that supports orbital angular momentum transmission and reception using intelligent reflecting surfaces in accordance with aspects of the present disclosure.

Some wireless communications systems, such as 5G new radio (NR), may have access to massive amounts of spectrums (e.g., millimeter wave (mmWave) systems). Such wireless communications systems may leverage different modulation schemes to increase data throughput over a given spectrum between wireless devices. For example, a wireless device may utilize horizontal and vertical polarizations, which provide two orthogonal carriers to separately encode and transmit information. As another example, a wireless device may utilize Orbital Angular Momentum (OAM) signaling to increase a number of orthogonal carriers (e.g., modes) and, therefore, data throughput. For example, a wireless device in a 5G new radio (NR) system may utilize a number of orthogonal OAM modes to encode and transmit information to a second wireless device. However, in some cases, an antenna associated with the wireless device may restrict the number of available OAM modes. For example, the wireless device may utilize a uniform circular array (UCA), which may correspond to a fixed OAM mode resolution (e.g., antenna element spacing such that the most OAM modes the wireless device may generate is 5).

Additionally, the fixed nature of the UCA may inhibit optimization of the received signals at the second wireless device. For example, a canted receiver may result in elliptical modes, where the ellipticity of the modes may be fixed due to the fixed nature of the UCA. Lastly, in 5G NR, atmospheric attenuation and blockages due to objects in a geographic region may diminish signaling quality, which may further degrade the utilization of OAM modes. For example, at higher bands such as mmWave, signaling may experience increased propagation losses, even in light-of-sight (LOS) scenarios due to very short wavelength and absorption by various environmental effects. Additionally, signaling may experience very high diffraction losses that may make non-line-of-sight (NLOS) communications difficult, even with increased antenna gains. In some examples, the wireless communications systems may leverage network densification to mitigate or remedy signal loss. For example, the wireless communications systems may utilize network densification using various layers of components, such as one or more base stations, remote-radio-heads (RRH), various types of repeaters, small-cells, femto-cells, and reflecting surfaces to compensate for propagation losses.

The wireless communications systems may utilize more than one type reflecting surfaces, such as fixed reflecting surfaces and meta-surfaces. Additionally or alternatively, the wireless communications systems may utilize intelligent reflecting surfaces (IRSs) (e.g., or reconfigurable intelligent surfaces (RISs)), to extend signaling within the wireless communications system. Such IRSs may be described as a surface with densely packed surface elements, where each surface element has a controllable reflection coefficient by which a phase-shift between beams incident to and beams reflected beams from the IRS may be controlled. Depending on the implementation, various forms of non-ideal effects may occur. For example, the phase-shift at the IRS may have a limited range, a gain variation dependent on the phase-shift, or both. However, by properly setting surface phases (e.g., setting the phases of surface elements associated with the IRS based on impinging signal phase mapping values), a beam originating from a base station may be reflected by the IRS towards a user equipment (UE) (e.g., for downlink) or vice versa (e.g., for uplink). In such cases, the utilization of one or more IRS to support communications between the base station and the UE may result in reduced pathloss and avoidance of blockages in LOS propagation. It should be noted that, while 5G mmWave systems may utilize IRSs for communications, any number of other technologies (e.g., 4G LTE, 802.11 Wi-Fi, future generations such as beyond 5G and 6G) or other bands (e.g., sub-6 GHz, terahertz-bands) may leverage such IRS configurations. Additionally, the densely packed surface elements, together with the controllable reflection coefficients, make IRSs attractive candidates for OAM generation and maintenance within wireless communications systems.

Aspects of the present disclosure relate to the usage of IRSs for transmission, reception, or both, of beamformed OAM signals. For example, instead of a UCA, one or more IRS may be utilized for OAM signal generation and reception, since IRSs may have wider apertures and finer structure (e.g., near continuous surface phase programmability) as compared to a UCA, which may correspond to a fixed arrangement of a relatively small number of discrete antenna elements. As such, one or more IRSs may be more easily adapted (e.g., electronically) to changes in orientation and distance between a transmitter and receiver, whereas a UCA may not be easily restructured and may require physical restructuring/orienting. Additionally, the one or more IRSs may combine OAM generation and lensing functions, whereas a UCA may require an external lens to keep modes from diverging during propagation. Given such motivations for utilizing IRSs for OAM transmission and reception, aspects of the present disclosure provide techniques to generate OAM at an IRS and adapting the IRS for optimal reception.

Aspects of the disclosure are initially described in the context of wireless communications systems. Aspects of the present disclosure are further illustrated by and described with reference to a geometry detection scheme, a power density mapping, an impinging signal phase mapping, a feedback arrangement, and a process flow. Aspects of the disclosure are further illustrated by and described with reference to apparatus diagrams, system diagrams, and flowcharts that relate to orbital angular momentum transmission and reception using intelligent reflecting surfaces.

FIG. 1 illustrates an example of a wireless communications system 100 that supports orbital angular momentum transmission and reception using intelligent reflecting surfaces in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPS). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

Aspects of the present disclosure relate to utilizing an IRS tracking algorithm, or both, to receive, calibrate, and maintain OAM signaling between wireless devices. The present disclosure describes a first wireless device transmitting spatial-MIMO beams to the IRS such that the incident waves at the IRS form concentric OAM modes. The IRS may reflect such OAM modes to a second wireless device for reception, calibration, and optimization. For example, the second wireless device may perform pattern recognition of the concentric OAM modes (e.g., by estimating ellipse geometry) to determine the modes of the OAM signaling. The second wireless device may also perform decorrelation, where small perturbations to the elliptical OAM geometry (e.g., by adjusting one or more parameters at the IRS) allow the second wireless device to perform one or more optimization techniques related to the OAM signaling. Lastly, the second wireless device may transmit feedback to the first wireless device to optimize one or more transmission parameters, such as precoding or gross error correction. Such perturbations may continue throughout communications to accomplish tracking, or small periodic measurements to ensure the OAM signals maintain high power and orthogonality. Additionally, by leveraging IRS as intermediate nodes to reflect OAM transmissions in wireless communications systems, extended OAM signaling (e.g., in dense environments) may be realized.

Figure 2:
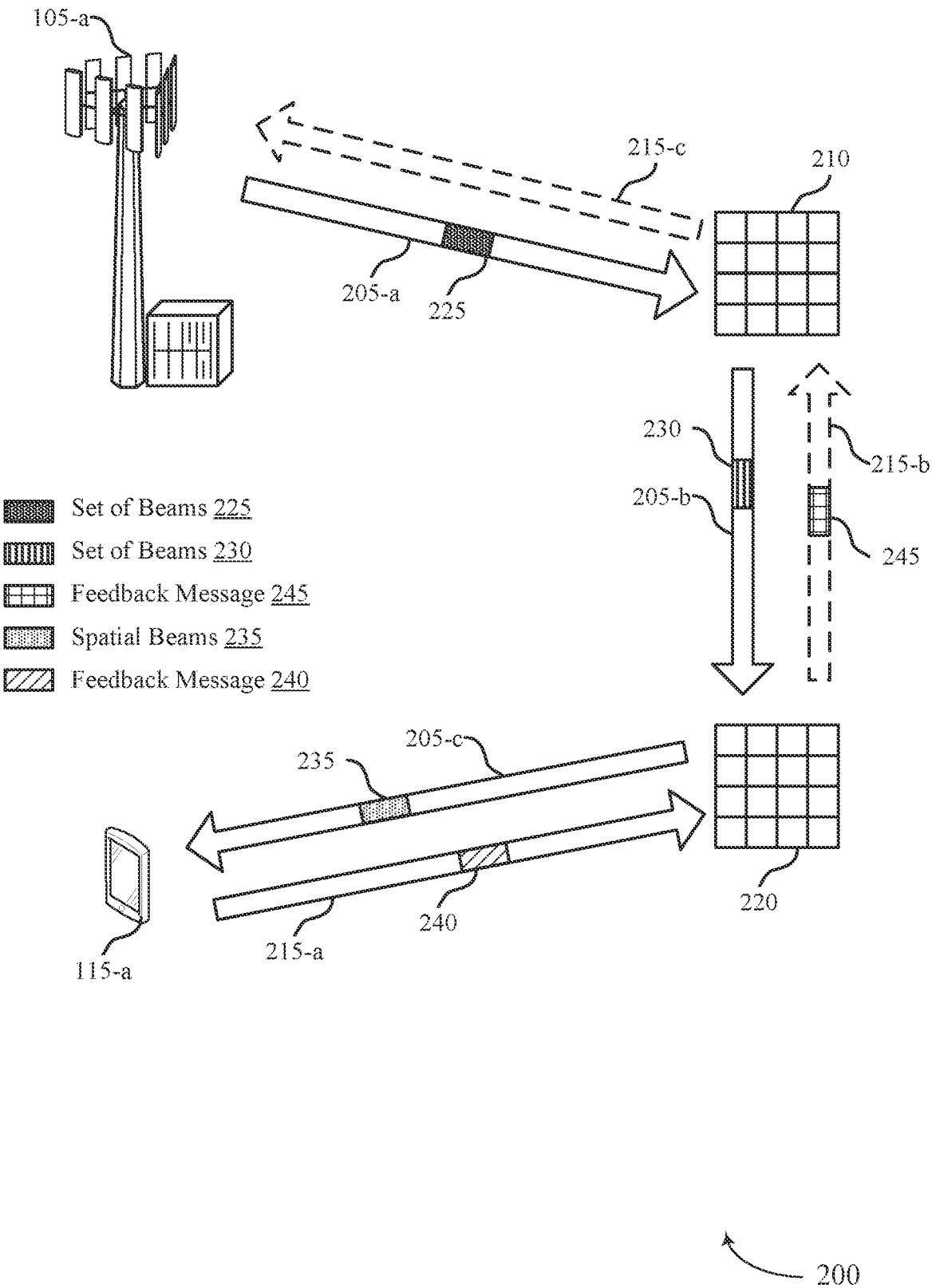
FIG. 2 illustrates an example of a wireless communications system that supports orbital angular momentum transmission and reception using intelligent reflecting surfaces in accordance with aspects of the present disclosure.

FIG. 2 illustrates an example of a wireless communications system 200 that supports orbital angular momentum transmission and reception using intelligent reflecting surfaces in accordance with aspects of the present disclosure. The wireless communications system 200 may implement or be implemented by one or more aspects of the wireless communications system 100. For example, the wireless communications system 200 may include a UE 115-*a*, an transmit IRS 210, a receive IRS 220, and a base station 105-*a*, which may be examples of the UE 115 and the base station 105 as described with reference to FIG. 1. It should be noted that, while examples are discussed below, any number of devices and device types may be used to accomplish implementations described in the present disclosure.

The base station 105-*a* may communicate with the UE 115-*a* via one or more OAM signals over one or more channels. In accordance with aspects described by the present disclosure, the base station 105-*a* may leverage one or more IRSs to generate, initialize, and maintain the OAM signals. For example, the base station 105-*a* may initialize OAM communication by transmitting a set of beams 225 over a downlink channel 205-*a* to the transmit IRS 210. In some cases, the set of beams 225 may correspond to a combination of spatial-MIMO beams and crude OAM signals (e.g., in cases where the base station 105-*a* bypasses the transmit IRS 210) originating from one or more antenna arrays associated with the base station 105-*a*. In other cases, the set of beams 225 may correspond to spatial-MIMO beams (without OAM signals) originating from one or more antenna arrays associated with the base station 105-*a*. In such cases, the spatial-MIMO beams may impinge upon the transmit IRS 210. Based on the impinging set of beams 225, the transmit IRS 210 may reflect the set of beams 225 to produce a set of beams 230, which may be transmitted over an associated downlink channel 205-*b*. In some cases, the set of beams 230 may correspond to spatial-MIMO beams (e.g., multiple spot-beams), OAM signals, or a mixture of both spatial-MIMO beams and OAM signals at the transmit IRS 210, during propagation, or both.

The transmit IRS 210 may generate the set of beams 230 such that OAM signals are produced at the receive IRS 220 (e.g., target-oriented OAM) at one or more locations, orientations, size, and the like. Such OAM signals produced at the receive IRS 220 may correspond to respective ellipses corresponding to respective OAM modes. For example, the set of beams 230 may result in one or more OAM modes at the receive IRS 220 such that each OAM mode may be a separate ring or ellipse with a common center and eccentricity. Such an arrangement of rings may be utilized to allow separation of streams (e.g., modes) as the receive IRS 220 may have a single phase-shift per surface element. For example, if the ellipses associated with OAM modes are non-overlapping, the receive IRS 220 may distinguish between OAM modes. In some examples, such as when the ellipses are partially overlapping, the receive IRS 220 may still separate the OAM modes with some loss of power.

Based on identifying and separating the OAM modes at the receive IRS 220, the receive IRS 220 may convert the OAM modes to spatial beams 235, which may be transmitted (e.g., beamformed) over a downlink channel 205-c to the UE 115-a for reception, initialization, and optimization. For example, the receive IRS 220 may adjust one or more impinging signal phase mapping values parameters such that each mode of the OAM modes are separated into the spatial beams 235 and transmitted to separate receiving antennas at the UE 115-a via adjustments to reflection coefficients at a surface element n based on $$\Gamma_n = e^{\left(\frac{2\pi d_{n,rx}}{\lambda} - \theta_{impinging,n}\right)},$$

where $d_{n,rx}$ is a known distance from a surface element n to a receiving antenna and $\theta_{impinging,n}$ is an estimated surface phase. Such a surface phase may convert an impinging OAM mode on the receive IRS 220 to a spatial beam of the spatial beams 235, where the spatial beam is focused on the receive antenna. That is, the receive IRS 220 may transmit the spatial beams 235 such that each respective OAM mode impinges on a respective antenna array portion such that none of the respective antenna array portions overlap. In some cases—such as when eccentricities associated with one or more ellipses is nonzero—equalization, decorrelation, or both, may be utilized to restore orthogonality (e.g., to minimize or eliminate overlap between ellipses).

For example, to perform an initialization procedure of the OAM modes, the UE 115-a may receive the spatial beams 235 and perform a pattern recognition routine to have an initial estimate of parameters associated with each ellipse at the receive IRS 220. For example, the UE 115-a may detect ellipse geometry via power-density mapping, phase pattern mapping, power profile and phase profile estimation, or some combination thereof. In some examples, for each ellipse, the UE 115-a and the receive IRS 220 may determine a set of parameters corresponding to the ellipses. For example, based on the detection, the UE 115-a and the receive IRS 220 may determine an associated center, major axis, minor axis, gaussian cross-section parameters (e.g., thickness of each ellipse), a power profile associated with each ellipse, or some combination thereof. Based on determining the set of parameters, the UE 115-a may transmit a feedback message 240 to a surface controller associated with the receive IRS 220 via an uplink channel 215-a. In other cases, such as if major problems are detected with ellipse geometry, the UE 115-a may transmit a feedback message 245 to the base station 105, the transmit IRS 210, or both,-a via uplink channels 215-b and 215-c. Based on the feedback message 240, the feedback message 245, or both, the wireless communications system 200 may initialize OAM communications based on the target-oriented signals, the spatial beams 235 converted by the receive IRS 220, and the feedback messages 240 and 245.

Following initialization, the wireless communications system 200 may perform decorrelation with respect to OAM communications. For example, the UE 115-a may instruct the receive IRS 220 to introduce small perturbations to ellipse geometries to perform gradient-based power maximization and decorrelation (e.g., using an estimated channel matrix associated with the OAM communications, where the estimated channel matrix may correspond to an end-to-end channel matrix from the base station 105-a to the UE 115-a). In some cases, power maximization may correspond to maximizing diagonal elements of the estimated channel matrix and decorrelation may correspond to minimizing off-diagonal elements of the estimated channel matrix. Based on the gradient-based power maximization and decorrelation, the UE 115-a may transmit feedback to the receive IRS 220 to adjust one or more surface parameters to ensure decorrelation between the spatial beams 235.

In some examples, the wireless communications system 200 may perform capacity maximization with respect to the OAM communications. For example, the UE 115-a may transmit the feedback message 245 indicating PMI feedback to a transmission modem associated with the base station 105-a.

During communications, one or more devices within the wireless communications system 200 may perform tracking procedures to maintain robust communications. For example, small perturbations may be made periodically (e.g., by the receive IRS 220) to maintain high signal power and uncorrelated OAM streams. In some examples, the UE 115-a, the receive IRS 220, the transmit IRS 210, and the base station 105-a may initialize and track uplink communications separately (e.g., due to the non-reciprocal nature of the wireless communications system 200). For example, the same IRSs (e.g., the receive IRS 220 and the transmit IRS 210) and the same procedures may be used in a time division duplexing (TDD) mode.

Based on the decorrelation and capacity maximization, the base station 105-a and the UE 115-a may communicate via OAM signaling over the receive IRS 220 and the transmit IRS 210 (e.g., for uplink, downlink, or both).

Figure 3:
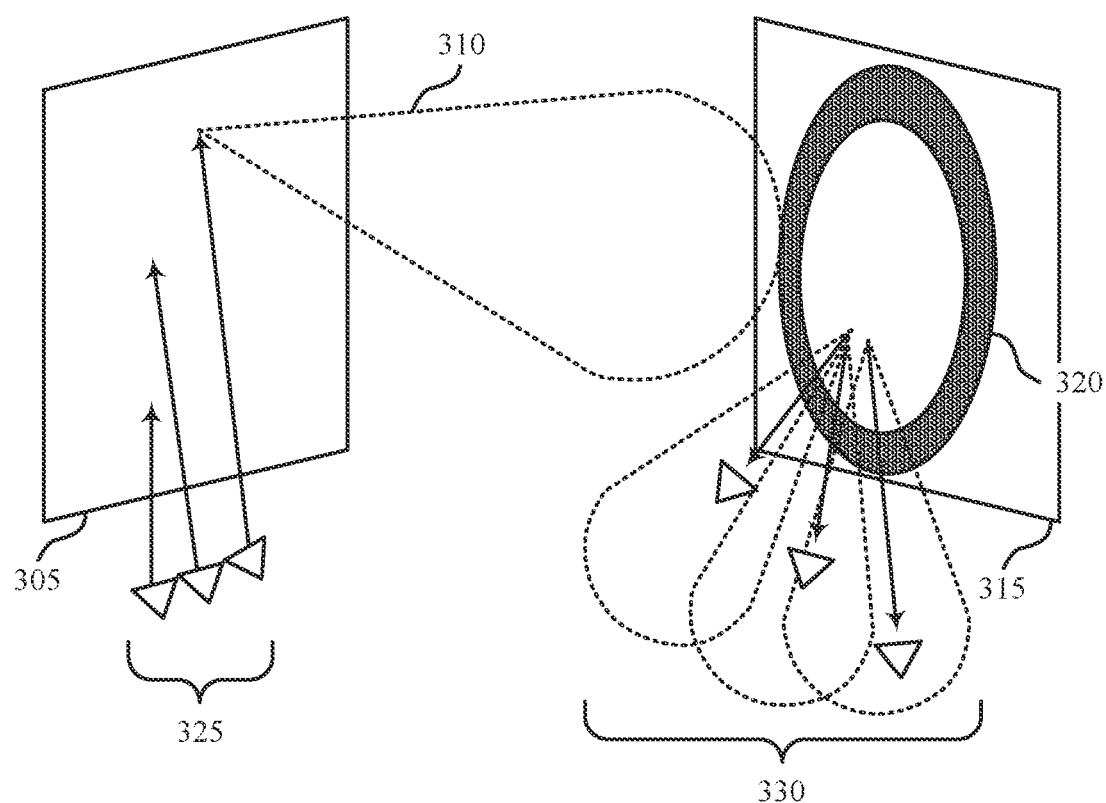
FIG. 3 illustrates an example of a geometry detection scheme that supports orbital angular momentum transmission and reception using intelligent reflecting surfaces in accordance with aspects of the present disclosure.

FIG. 3 illustrates an example of a geometry detection scheme 300 that supports orbital angular momentum transmission and reception using intelligent reflecting surfaces in accordance with aspects of the present disclosure.

As part of the initialization of OAM signaling via one or more IRSs, one or more wireless devices may determine one or more ellipses corresponding to OAM modes impinging at the receive IRS, as discussed with reference to FIG. 2. To accomplish such determinations, one or more wireless devices may perform pattern recognition to determine an initial estimate of ellipse geometries associated with the OAM modes. Without a reasonable initial estimate of incoming waveform geometry, subsequent refinement steps (e.g., gradient-based techniques in decorrelation) may not converge due to the complex nature of a phase front associated with OAM communications. For example, a UE and IRS may perform pattern recognition of ellipse geometries by leveraging an impinging wavefront power density and an impinging wavefront phase pattern as an initial estimate before decorrelation, capacity maximization, and tracking.

However, determining an initial estimate for all OAM modes simultaneously may be difficult due to unoptimized ellipse geometries, correlation, and the like. As such, during the initialization step, OAM modes may be initialized sequentially. That is, only one active transmit stream (e.g., a set of transmissions, which may correspond to spatial-MIMO, a crude OAM mode, or both, associated with a single OAM mode) may be used at one time. As such, during the initialization stage, a pattern per OAM mode may be determined, from which later steps (e.g., such as gradient-ascent optimization) may be performed.

While a single OAM mode is active, the initialization step may be divided into three sub-steps. For example, Step 1A may correspond to estimating an impinging power density pattern and map elliptical boundaries associated with a single active OAM mode, which is further described with reference to FIG. 4. Step 1B may correspond to mapping a phase pattern to the established elliptical pattern associated with the single active OAM mode, which is further described with reference to FIG. 5. Step 1C may correspond to creating a refined power density mapping and phase pattern for the single active OAM mode, which is also further described with reference to FIG. 5.

For example, an antenna array 305 (e.g., associated with a base station, a transmit IRS, etc.) may transmit an OAM mode 310 to a receive IRS 315 to perform pattern recognition on an ellipse 320 (e.g., corresponding to the OAM mode 310) generated at the receive IRS 315. In some cases, the antenna array 305 may correspond to a transmit IRS, where the transmit IRS reflects a spatial-MIMO beam 325 associated with the OAM mode 310 to the receive IRS 315. In any case, the receive IRS 315 may form one or more receive beams 330. Based on the one or more receive beams 330, a receiver (e.g., UE) may receive the one or more receive beams 330. Based on the one or more receive beams 330, the UE may perform the initialization steps as described above.

Figure 4:
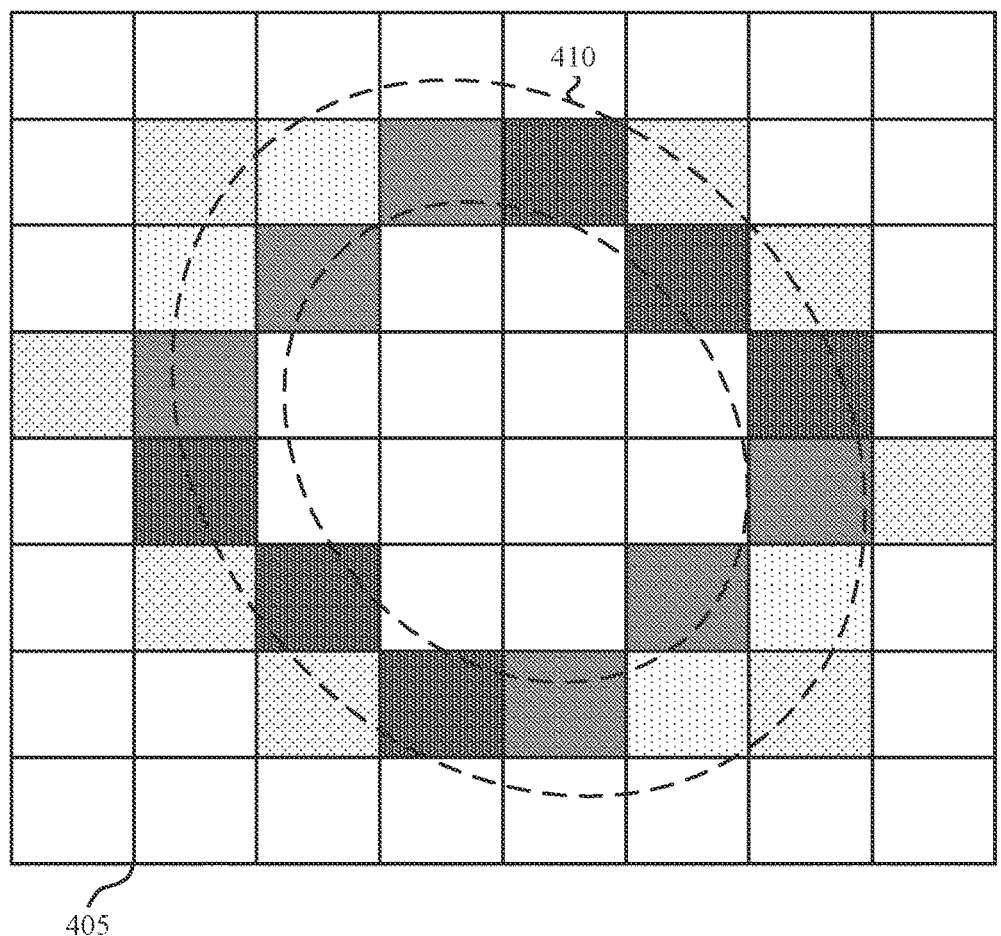
FIG. 4 illustrates an example of a power density mapping that supports orbital angular momentum transmission and reception using intelligent reflecting surfaces in accordance with aspects of the present disclosure.
Figure 4:
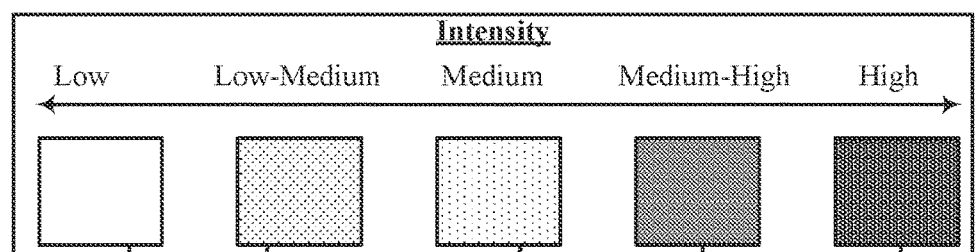
Figure 4:
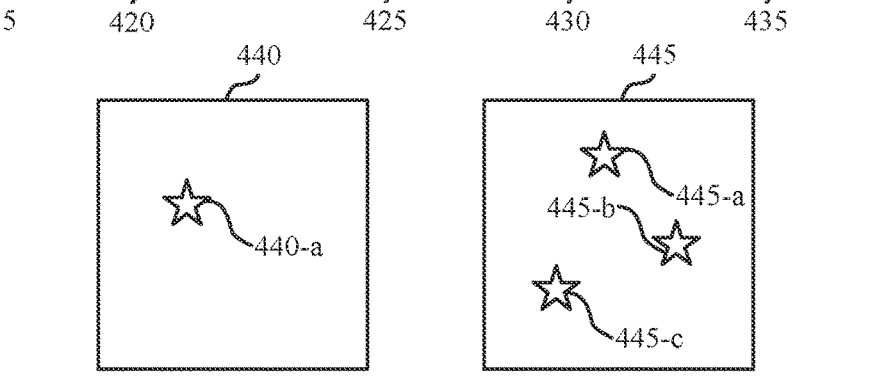

FIG. 4 illustrates an example of a power density mapping 400 that supports orbital angular momentum transmission and reception using intelligent reflecting surfaces in accordance with aspects of the present disclosure.

The power density mapping 400 depicts an example of the IRS 405, where the IRS 405 corresponds to an 8×8 subarea grid with each subarea including an associated intensity. For example, a given subarea may be associated with an intensity value, such as low intensity 415, low-medium intensity 420, medium intensity 425, medium-high intensity 430, and high intensity 435. While an exemplary grid size and exemplary intensity values are depicted, any number of grid size may be used and any ranking of intensity may be utilized (e.g., near continuous numerical intensities).

Step 1A of the initialization may correspond to a power-density mapping procedure to generate a coarse power-density mapping 410 over the IRS 405 for each OAM mode, where the coarse power-density mapping 410 may be generated for each OAM mode sequentially by the IRS 405 and a receiving UE, as discussed with reference to FIG. 3. The coarse power-density mapping 410 may be generated based on segments of the IRS 405. For example, a surface area associated with the IRS 405 may be subdivided into a sufficiently large number of subareas, each large enough to reflect detectable power. In some cases, such as that illustrated in FIG. 4, the subareas may correspond to one surface element. In other examples, the subareas may correspond to any number of surface elements.

In some examples, the IRS 405, the UE, or both, may assign one or more virtual focal point location for each subarea (e.g., a point behind a surface where reflected energy appears to originate from). For example, subarea 440 depicts a location associated with a virtual focal point 440-$a$, where beams reflected by the IRS 405 may appear to have a focal point behind the surface element. In other cases, the focal point may appear to be in front of the subarea, on the subarea, or the like. In other examples, an enhanced focal point procedure may be utilized to use multiple virtual focal points per subarea. For example, surface element 445 depicts three respective locations associated with three respective focal points (e.g., virtual focal points 445-$a$, 445-$b$, and 445-$c$).

Based on the virtual focal points and the average intensity in each subarea, the IRS 405, UE, or both, may apply an orthogonal cover code (OCC)-based channel estimation algorithm. Alternatively, a subarea may be activated one at a time such that, In each time instant, receive antennas receive and measure power from a given subarea. During the channel estimation algorithm, channel coefficients may be estimated from all receive antennas at the UE (e.g., not just the ones assigned to eventually receive the OAM mode). Following the channel estimation, the UE, IRS 405, or both, may compute a power-density estimate for each segment (e.g., set of surface elements, one surface element).

For example, the IRS 405 and the UE may compute the magnitude-squared of estimated channel coefficients for each segment of the receiving antennas at the UE. Based on the magnitude-squared of estimated channel coefficients, the UE, IRS 405, or both, may find the max or the median across receiving antennas and assign the max or the median for each segment. In some examples, such as when multiple virtual focal points are used per segment, the UE, IRS 405, or both, may compute a max or median for each segment, which may further improve initial estimates of impinging wavefront geometry. During this stage, the phase of channel coefficients may be discarded.

Figure 5:
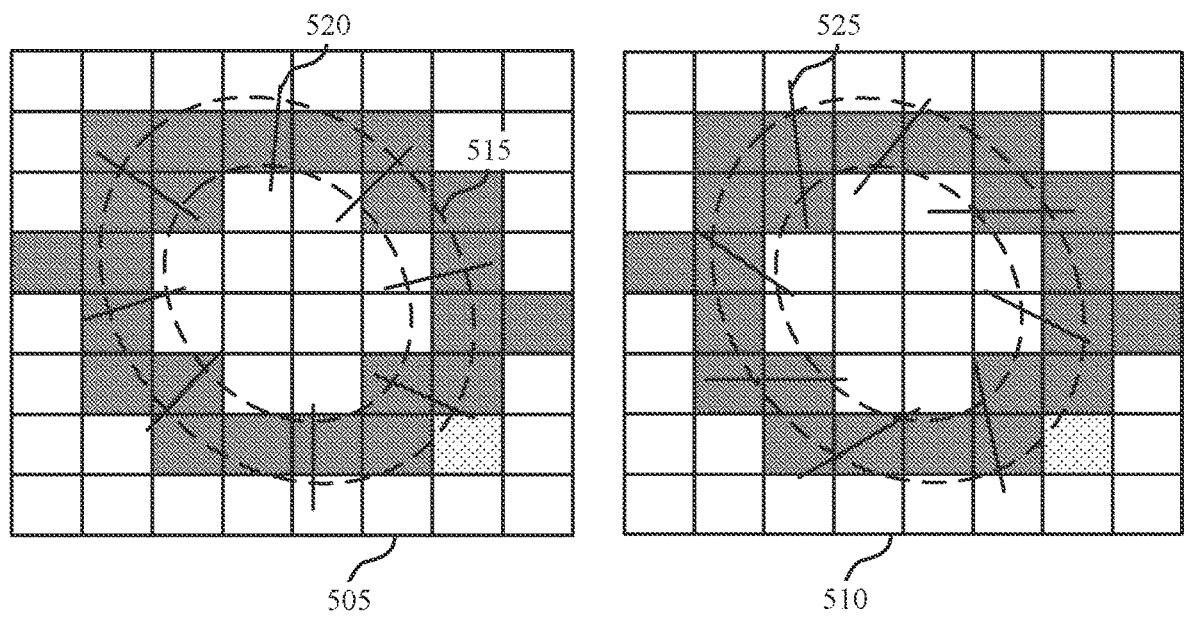
FIG. 5 illustrates an example of an impinging signal phase mapping that supports orbital angular momentum transmission and reception using intelligent reflecting surfaces in accordance with aspects of the present disclosure.
Figure 5:
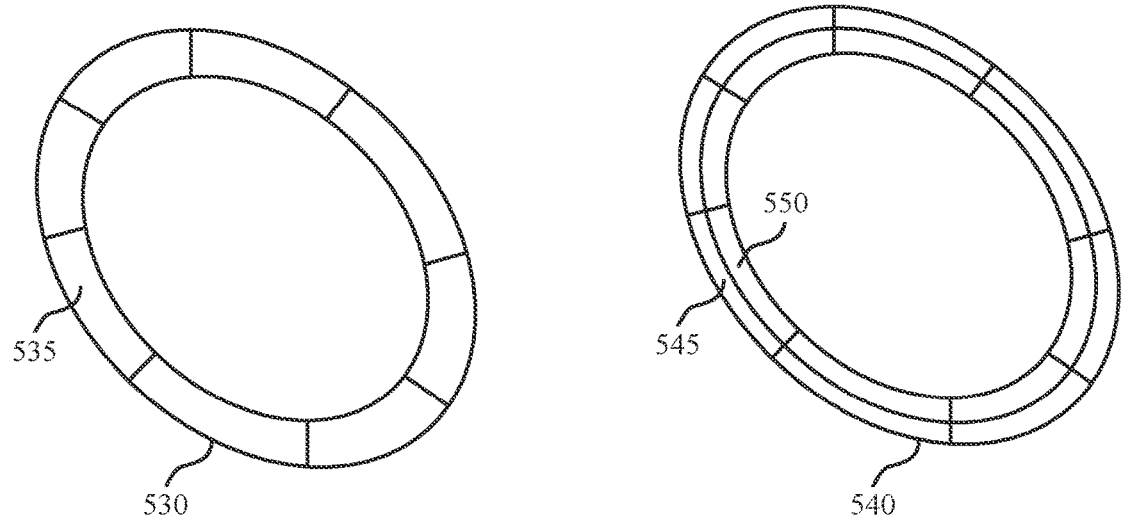

FIG. 5 illustrates an example of a impinging signal phase mapping 500 that supports orbital angular momentum transmission and reception using intelligent reflecting surfaces in accordance with aspects of the present disclosure.

The impinging signal phase mappings 500 depicts two examples of IRSs (e.g., IRS 505 and IRS 510) associated with Step 1B of the initialization, where the IRSs correspond to 8×8 subarea grids with each subarea including an associated intensity, which may be determined based on the coarse power density mapping in Step 1A of the initialization. That is, based on the determined boundaries of an ellipse associated with an OAM mode, impinging signal phase mappings may be determined.

For example, a coarse impinging signal phase mapping may be determined for an elliptical area 515 (e.g., estimated during Step 1A) on IRS 505. In such cases, a phase may be assigned around the elliptical area 515 such that the phase uniformly varies from 0 (e.g., at some arbitrary point) to $2m\pi$, where m is a known index mode. For example, based on the IRS 505 and the elliptical area 515 (e.g., with m=1), a radial constant line 520 may be assigned as zero phase, with subsequent radial constant lines mapping a uniformly varying phase across the elliptical area 515 based on the radial constant line 520.

In some cases, such as if a swirl is present within the impinging signal phase mapping, one or more hypothesis may be considered where the radial constant lines vary with radial distance. For example, IRS 510 illustrates a coarse impinging signal phase mapping with a swirl hypothesis. In some examples, swirl hypothesis may be applied with varying phase angles, constant phase angles, or both. IRS 510 illustrates an application of a 25 degree swirl hypothesis, where the radial line 525 corresponds to the arbitrary zero phase point associated with the impinging signal phase mapping. In some cases, if the swirl hypotheses are used, subsequent steps for initialization may be repeated for each hypothesis, where the hypothesis with a highest power may be selected.

Given coarse estimates of ellipse boundaries and impinging signal power and phase mapping obtained in Steps 1A and 1B for each OAM mode, a more accurate power and phase profile may be obtained in Step 1C. In Step 1C, higher accuracy estimates may be obtained by utilizing focused beams as opposed to wide beams which may produce a stronger signal at the receiver. Additionally, accuracy may also be increased due to "toning down" of uneven power distribution of the DFT bases that may break orthogonality.

In such cases, an ellipse associated with a given OAM mode (e.g., ring 530) may be segmented into n segments 535, where surface phase values are set to form a focused beam towards the receiving antenna intended for the mode (e.g., according to $$\Gamma_n = e^{i\left(\frac{2\pi d_{n,tx}}{\lambda} - \theta_{impinging,n}\right)}.$$

In some cases, the antenna associated with the given OAM mode may be utilized. Using the antenna associated with the given OAM mode, the power and phase distributions for the antenna may be fine tuned and adjusted to maintain orthogonality. For example, orthogonality may be maintained using OCC based channel estimation, activating one subarea at a time to estimate complex channel coefficients for each subarea, or both. For example, the receiving antenna may estimate channel coefficients for each segment 535 and produce estimates of power density and any additional phase adjustments. A power profile is to be used to equalize uneven power distributions for a DFT basis corresponding to the OAM mode. Based on the estimated power profile, equalization over the DFT vector power may be performed to "tone-down" unevenly high-intensity sections of the DFT vector (e.g., due to elliptical distortion as well as path loss between IRS surface elements and the receiving antenna). In some cases, toning-down may be accomplished by programming the surface elements to diffuse some impinging power.

In examples where a swirl hypothesis is used to determine an impinging signal phase mapping, a ring 540 associated with the impinging signal phase mapping may be divided into segments where the segments are further subdivided radially (e.g., segments 545 and 550). In such cases, a swirl associated with the impinging wavefront may be better estimated by increasing the resolution with which the ring 540 is segmented. Based on Steps 1A, 1B, and 1C, an initial estimate of impinging signal phase mappings for each respective OAM mode may be acquired.

Figure 6:
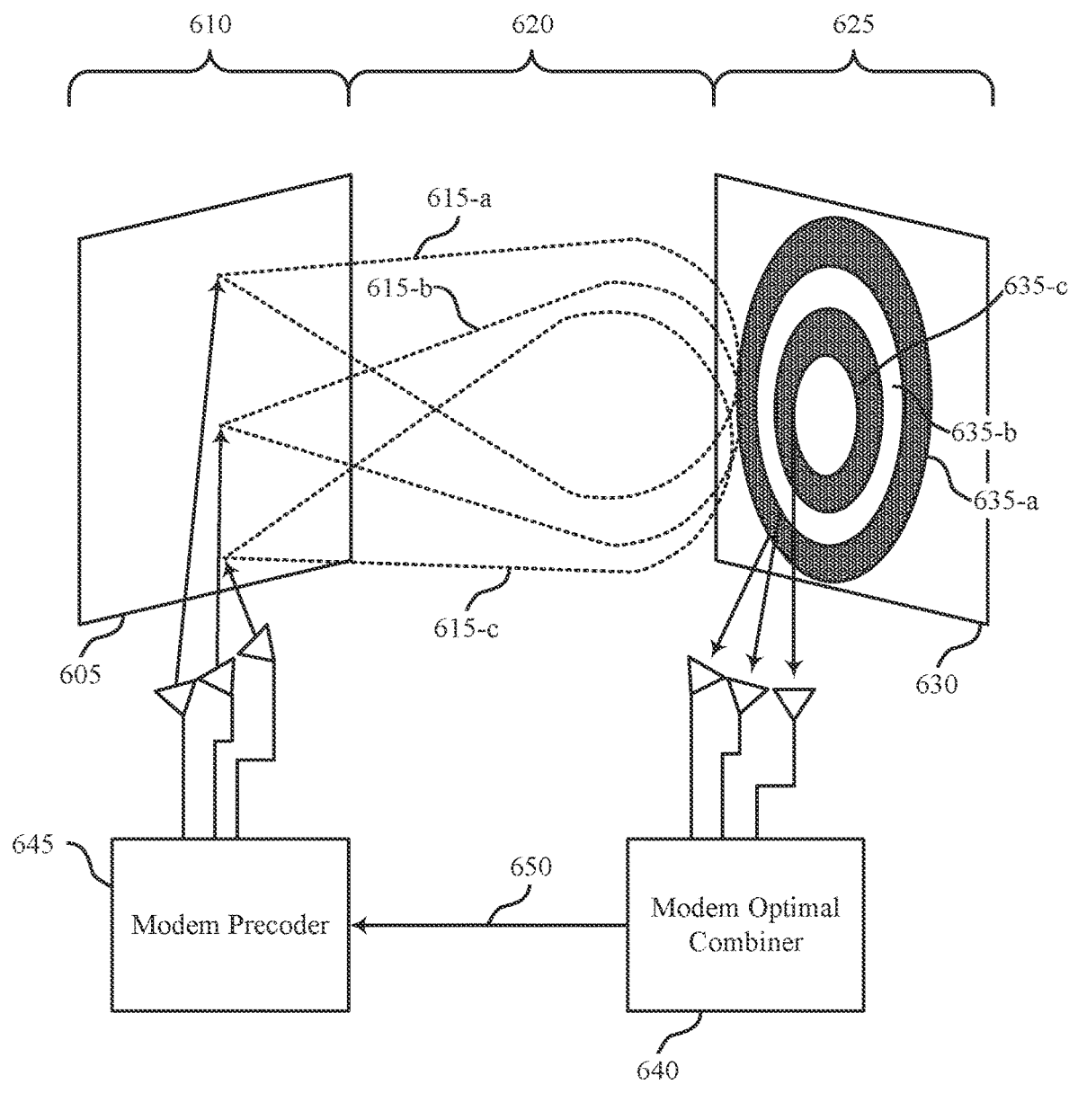
FIG. 6 illustrates an example of a feedback arrangement that supports orbital angular momentum transmission and reception using intelligent reflecting surfaces in accordance with aspects of the present disclosure.

FIG. 6 illustrates an example of a feedback arrangement 600 that supports orbital angular momentum transmission and reception using intelligent reflecting surfaces in accordance with aspects of the present disclosure.

In Step 1 (e.g., Steps 1A, 1B, and 1C), an initial estimate of impinging signal phase mapping values for each respective OAM mode 635 is obtained. Based on the impinging signal phase mapping values, incremental adjustments may be made to respective impinging signal phase mapping values (e.g., reflection coefficients at an receive IRS 630) for decorrelation (e.g., Step 2). In Step 2, all OAM modes 635 may be turned on at the transmitter 605 and the receive IRS 630, where incremental adjustments to the receive IRS 630 may be performed to ensure orthogonality of the OAM modes 635. For example, the transmitter 605 may transmit beams 615-a, 615-b, and 615-c, to the receive IRS 630, which may be associated with spatial-MIMO signals 610 corresponding to all OAM modes 635. Incremental adjustments may be performed by a receiving antenna based at least in part on Step 1. During propagation, the spatial-MIMO signals 610 may correspond to a mixture of spatial-MIMO and OAM signals 620. For example, beams 615-a, 615-b, and 615-c may propagate as a mixture of spatial-MIMO and OAM signals 620. In other words, each mode propagates as an OAM mode, where each OAM mode of the OAM signals 620 may become concentric at the receive IRS 630. As the spatial-MIMO and OAM signals 620 impinge upon the receive IRS 630, the signals may correspond to OAM signals 625, where the OAM signals 625 may produce OAM modes 635 at the receive IRS 630. For example, the OAM modes 635-a, 635-b, and 635-c may impinge upon the receive IRS 630, each of the OAM modes 635 being associated with an ellipse with a respective ellipse center and eccentricity. It should be noted that Step 1A, the OAM modes 635 are transmitted sequentially, whereas in Step 2, all OAM modes 635 are transmitted simultaneously. Transmitting the OAM modes 635 simultaneously may allow for error corrections between a receiving antenna, the receive IRS 630, and the transmitter 605. In some cases, error corrections may be performed based on respective ellipse centers and eccentricities, ellipse boundary overlap, gaps in ellipse boundaries, gross errors in ellipse geometries, or some combination thereof.

For example, the respective ellipse center and eccentricity of all OAM modes 635 should be the same. In cases where the respective ellipse centers and eccentricities are not the same, one or more adjustments or small corrections may be performed to align the respective ellipse centers and eccentricities. By transmitting the OAM modes 635 simultaneously, the receiving antenna and the receive IRS 630 may determine discrepancies in respective ellipse centers and eccentricities and subsequently perform small adjustments to increase orthogonality between the OAM modes 635.

Additionally, boundaries associated with ellipses may be non-overlapping, which may be associated with increased orthogonality. For example, OAM mode 635-c may correspond to a first boundary, OAM mode 635-b may correspond to a second boundary, and 635-a may correspond to a third boundary. In some cases, however, ellipse boundaries may be overlapping. In cases where ellipse boundaries are overlapping, the receiving antenna, the receive IRS 630, or both, may determine to replace such boundaries with an average (e.g., or some other metric) of the two.

In other examples, such as if gaps are observed between adjacent elliptical boundaries, the receive IRS 630, the receiving antenna, or both, may determine to replace such gaps with an average (e.g., or other metric). In some cases, while determining errors in OAM mode geometry, gross errors may be detected. For example, one or more ellipses associated with the OAM modes 635 may be skewed such that an associated OAM mode is distorted. In such cases, feedback may be transmitted to the transmitter 605 (e.g., from the receiving antenna), where Step 1 may be performed again to correct the gross errors.

Following the error corrections, and based on estimated ring boundaries and toned-down (e.g., equalized) power profiles, the receiving antenna and the receive IRS 630 may determine impinging signal phase mapping values (e.g., reflection coefficients) for elements of the receive IRS 630 such that respective OAM modes are beamed to respective antenna locations associated with the receiving antenna. That is, each OAM mode 635 may be beamed to spatially distinct antenna elements corresponding to the receiving antenna, clusters of antenna elements (e.g., which may be overlapping), or both. Upon determining the impinging signal phase mapping values for the elements of the receive IRS 630, a mapping may be established between the spatial-MIMO signals 610 and the received OAM modes 635 at different areas of antenna elements at the receiving antenna.

Once the mapping is established, the receiving antenna may measure a complex channel matrix including complex channel coefficients from each of the spatial-MIMO signals 610 (e.g., input streams) to each of the OAM modes 635 at the receiving antenna (e.g., output streams). Based on the complex channel matrix, the receiving antenna, the receive IRS 630, or both, may perform perturbations to associated variables (e.g., as determined by the complex channel matrix, parameters for the receiving antenna, the receive IRS 630, or both, ellipse parameters) to determine one or more metrics. For example, the receiving antenna may perform perturbations, via the receive IRS 630, to OAM mode boundaries associated with the OAM modes 635. During such perturbations, the receiving antenna may observe gradients of desired power (e.g., magnitude-squared of diagonal elements of the complex channel matrix), interference power (magnitude-squared of off-diagonal elements of the complex channel matrix), or both. Based on the observed gradients, the receiving antenna, the receive IRS 630, or both, may perform boundary adjustments. Additionally or alternatively, the receive IRS 630, the receiving antenna, or both, may perform power-profile adjustments following observing the gradients. Following the boundary adjustments, the power-profile adjustments, or both, the receiving antenna and the receive IRS 630 may move on to Step 3.

Step 3 may correspond to capacity maximization. That is, in establishing OAM modes 635 for communication via the receive IRS 630, the impinging signal phase mapping is optimized for best reception. In Step 3, however, capacity corresponding to the OAM modes 635 may be maximized by a modem precoder 645 and modem optimal combiner 640 optimization via a precoder matrix indicator (PMI) feedback message 650. For example, after observing gradients and performing adjustments, the receiving antenna, the receive IRS 630, and the transmitter, may perform a final estimation of the channel matrix using a set of reference signals transmitted by the transmitter. Put another way, a modem associated with the receiving antenna, the transmitter, or both, may observe a communication flow from the input streams to the output streams.

Based on the observation, the modem may compute an optimal modem-level precoder associated with the modem precoder 645 (e.g., at the transmitter), which may be restricted to a codebook. In some examples, the transmitter, the receiving antenna, the receive IRS 630, or a combination thereof, may reiterate ellipse boundaries and impinging signal phase mappings by gradient ascent together with the modem precoder 645 and the modem optimal combiner 640 to optimize the capacity associated with the OAM modes 635. After optimizing the capacity of the OAM modes 635, the transmitter may perform communication operations with the receiver with OAM modes 635 via the receive IRS 630.

Figure 7:
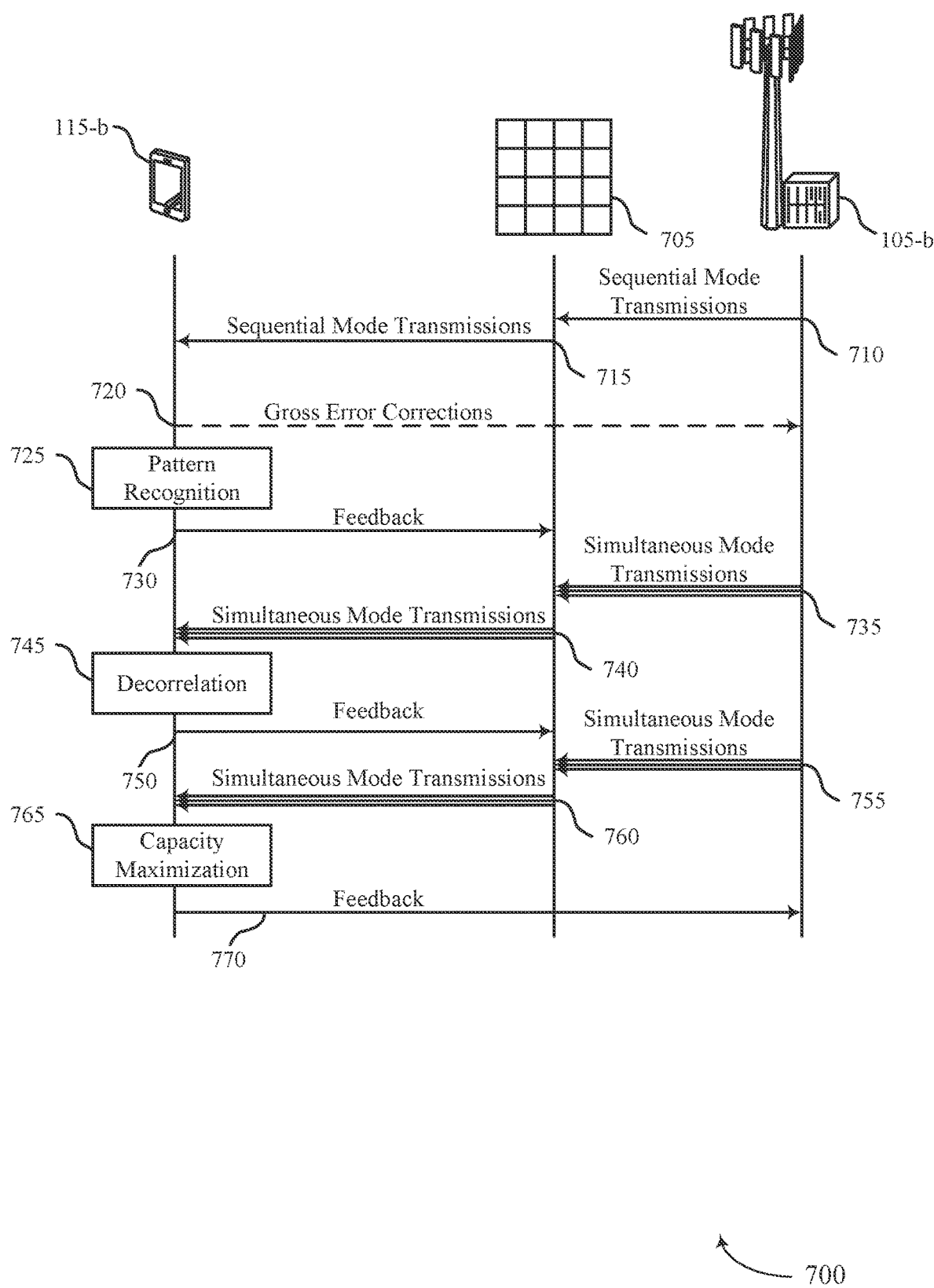
FIG. 7 illustrates an example of a process flow that supports orbital angular momentum transmission and reception using intelligent reflecting surfaces in accordance with aspects of the present disclosure.

FIG. 7 illustrates an example of a process flow 700 that supports orbital angular momentum transmission and reception using intelligent reflecting surfaces in accordance with aspects of the present disclosure. The process flow 700 may be implemented by one or more wireless devices, such as a UE 115-*b*, which may be an example of a UE 115 as described with reference to FIG. 1. In some examples, the process flow 700 may include one or more operations and procedures associated with a base station 105-*b* and the UE 115-*b*, which may be examples of those discussed with reference to FIGS. 2-6. While specific operations may be discussed below, the operations may be performed in a different order than the example order shown, or the operations performed by the devices may be performed by different devices or at different times.

At 710, the base station 105-*b* may perform sequential mode transmissions to the receive IRS 705 in support of Step 1 of initialization. In some examples, the sequential mode transmissions may be associated with spatial-MIMO transmissions at the base station 105-*b* and a mixture of spatial-MIMO and OAM modes while propagating to the receive IRS 705. In other examples, the sequential mode transmissions may be associated with OAM modes. At 715, the receive IRS 705 may reflect or otherwise retransmit the sequential mode transmissions to the UE 115-*b*.

At 720, based on the sequential mode transmissions at 715, the UE 115-*b* may perform gross error corrections to the received sequential mode transmissions (e.g., based on ellipse geometry). In some examples, gross error corrections may be transmitted to the base station 105-*b*. Based on the gross error correction, the base station 105-*b* may retransmit the sequential mode transmissions such that the gross error corrections may be mitigated.

At 725, the UE 115-*b* may perform pattern recognition associated with each respective OAM mode associated with the sequential mode transmissions. For example, the UE 115-*b*, the receive IRS 705, or both, may determine elliptical geometries associated with the OAM modes. At 730, the UE 115-*b* may transmit feedback to the receive IRS 705. For example, the UE 115-*b* may transmit feedback based on elliptical geometry metrics, such as an associated center, major axis, minor axis, gaussian cross section parameters, and a power profile over the ellipse.

Based on the determined geometric parameters, the base station 105-*a*, the receive IRS 705, and the UE 115-*b* may perform Step 2 of initialization. For example, at 735, the base station 105-*b* may perform simultaneous mode transmissions to the receive IRS 705, which may reflect or otherwise retransmit the simultaneous mode transmissions at 740 to the UE 115-*b*. Based on the simultaneous mode transmissions at 735 and 740, the UE 115-*b* may perform decorrelation, as described with reference to FIG. 6.

At 750, based on the decorrelation at 745, the UE 115-*b* may transmit feedback to the receive IRS 705 indicating small perturbation to ellipse geometries. Based on the feedback, the receive IRS 705 may adjust one or more parameters while the UE 115-*b* performs gradient based power maximization and decorrelation (e.g., using an estimated channel matrix).

At 755, the base station 105-*b* may continue simultaneous mode transmissions to the receive IRS 705, which may reflect or otherwise retransmit the simultaneous mode transmissions at 760 to the UE 115-*b*. Based on the simultaneous mode transmissions at 760, the UE 115-*b* may perform Step 3 of initialization (e.g., capacity maximization at 765, as described with reference to FIG. 6). Based on the capacity maximization, at 770, the UE 115-*b* may transmit feedback to the base station 105-*b*. In some cases, the feedback may include PMI feedback. Based on the feedback, the base station 105-*b* may communicate with the UE 115-*b* using OAM modes via the receive IRS 705. In some examples, the UE 115-*b*, the receive IRS 705, the base station 105-*b*, or a combination thereof, may perform tracking. While tracking, small perturbations are made periodically to keep signal power associated with the OAM modes high while maintaining decorrelation across the modes. In some examples, due to non-reciprocity of the communications between the UE 115-*b* and the base station 105-*b*, uplink may be initialized and tracked separately. In some cases, a same pair or single IRS and a similar initialization and tracking scheme may be utilized (e.g., in TDD mode).

Figure 8:
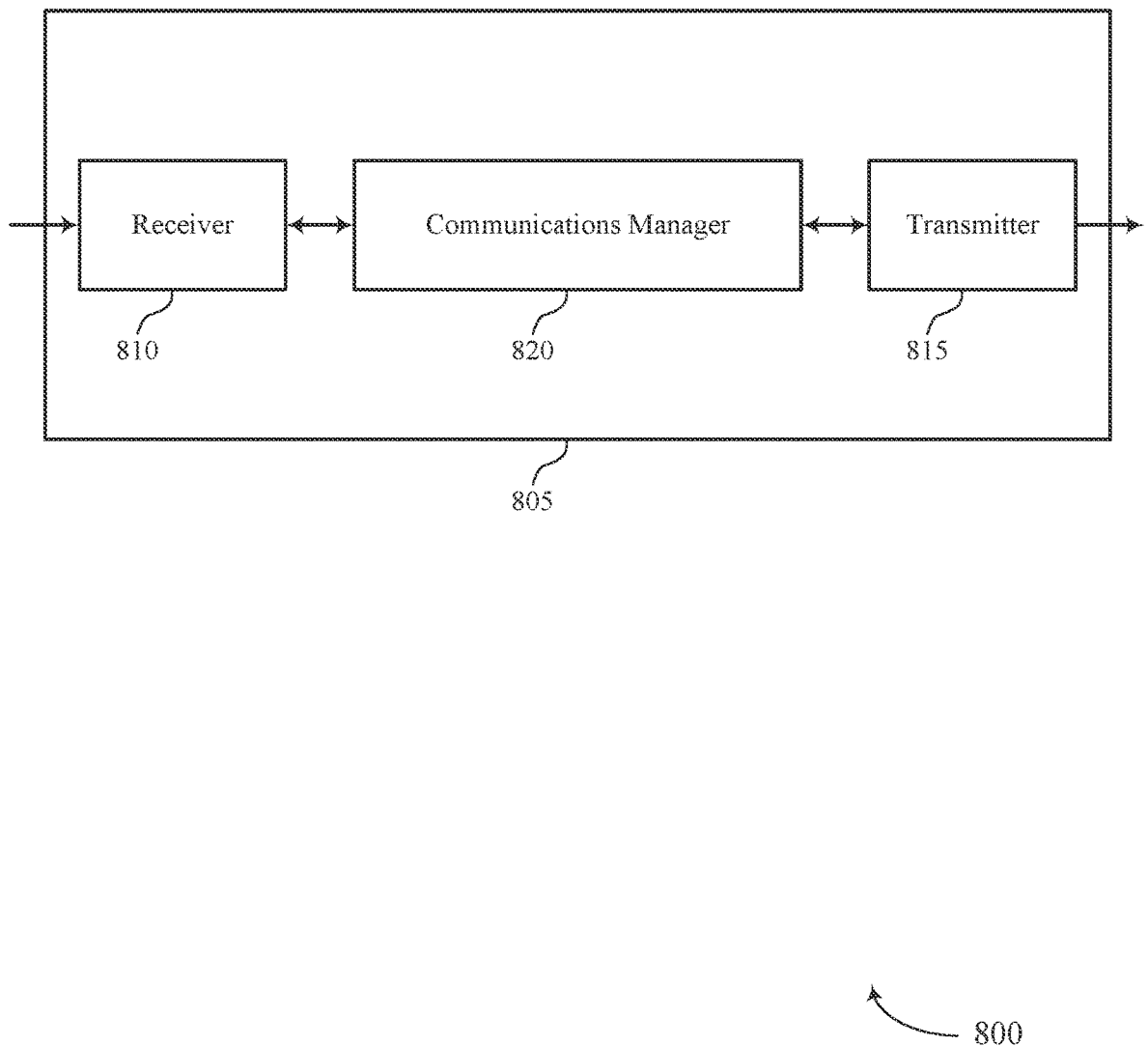
FIGS. 8 and 9 show block diagrams of devices that support orbital angular momentum transmission and reception using intelligent reflecting surfaces in accordance with aspects of the present disclosure.

FIG. 8 shows a block diagram 800 of a device 805 that supports orbital angular momentum transmission and reception using intelligent reflecting surfaces in accordance with aspects of the present disclosure. The device 805 may be an example of aspects of a wireless device as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to orbital angular momentum transmission and reception using intelligent reflecting surfaces). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to orbital angular momentum transmission and reception using intelligent reflecting surfaces). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of orbital angular momentum transmission and reception using intelligent reflecting surfaces as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an ASIC, a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a first wireless device in accordance with examples as disclosed herein. For example, the communications manager 820 may be configured as or otherwise support a means for receiving, using one or more antenna elements associated with the first wireless device, a set of orbital angular momentum signals via a set of antenna elements of an IRS. The communications manager 820 may be configured as or otherwise support a means for transmitting a feedback message based on the set of orbital angular momentum signals, the feedback message indicating one or more parameter adjustments for subsequent orbital angular momentum communications between the first wireless device and a second wireless device, the one or more parameter adjustments based on one or more measurements associated with the set of orbital angular momentum signals by the first wireless device. The communications manager 820 may be configured as or otherwise support a means for communicating with the second wireless device according to the one or more parameter adjustments based on the feedback message.

Additionally or alternatively, the communications manager 820 may support wireless communications at a second wireless device in accordance with examples as disclosed herein. For example, the communications manager 820 may be configured as or otherwise support a means for transmitting, using one or more antenna elements associated with the second wireless device, one or more signals associated with a set of orbital angular momentum modes via reflection by a set of antenna elements of an IRS. The communications manager 820 may be configured as or otherwise support a means for receiving a feedback message from a first wireless device based on the set of orbital angular momentum modes, the feedback message indicating one or more parameter adjustments for subsequent orbital angular momentum communications between the first wireless device and the second wireless device, the one or more parameter adjustments based on one or more measurements associated with the set of orbital angular momentum modes. The communications manager 820 may be configured as or otherwise support a means for communicating with the first wireless device according to the one or more parameter adjustments based on the feedback message.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for more efficient utilization of communication resources by utilizing techniques to establish and utilize OAM modes for communications via one or more IRSs.

Figure 9:
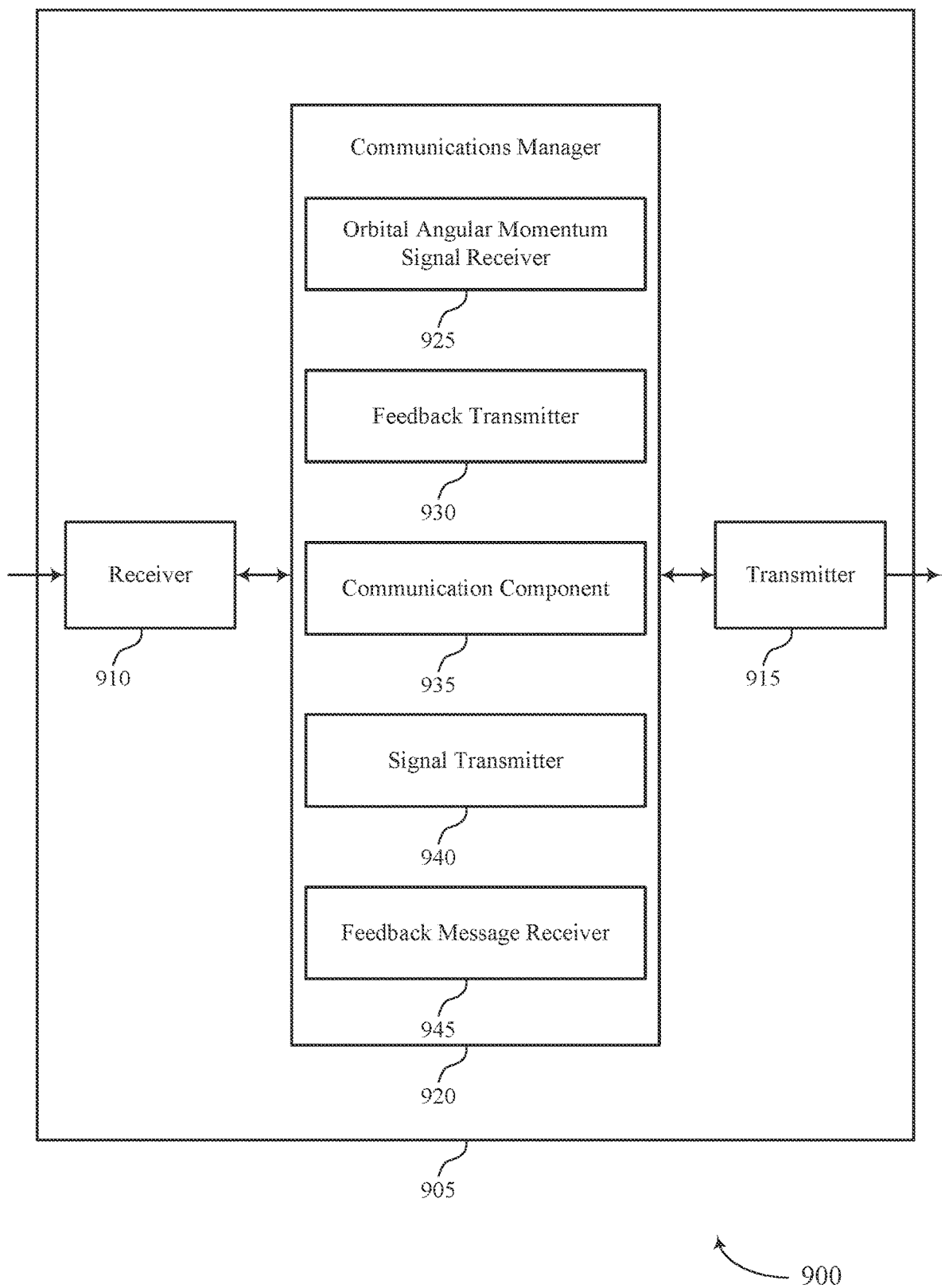

FIG. 9 shows a block diagram 900 of a device 905 that supports orbital angular momentum transmission and reception using intelligent reflecting surfaces in accordance with aspects of the present disclosure. The device 905 may be an example of aspects of a device 805 or a wireless device such as a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to orbital angular momentum transmission and reception using intelligent reflecting surfaces). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to orbital angular momentum transmission and reception using intelligent reflecting surfaces). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of orbital angular momentum transmission and reception using intelligent reflecting surfaces as described herein. For example, the communications manager 920 may include an orbital angular momentum signal receiver 925, a feedback transmitter 930, a communication component 935, a signal transmitter 940, a feedback message receiver 945, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a first wireless device in accordance with examples as disclosed herein. The orbital angular momentum signal receiver 925 may be configured as or otherwise support a means for receiving, using one or more antenna elements associated with the first wireless device, a set of orbital angular momentum signals via a set of antenna elements of an IRS. The feedback transmitter 930 may be configured as or otherwise support a means for transmitting a feedback message based on the set of orbital angular momentum signals, the feedback message indicating one or more parameter adjustments for subsequent orbital angular momentum communications between the first wireless device and a second wireless device, the one or more parameter adjustments based on one or more measurements associated with the set of orbital angular momentum signals by the first wireless device. The communication component 935 may be configured as or otherwise support a means for communicating with the second wireless device according to the one or more parameter adjustments based on the feedback message.

Additionally or alternatively, the communications manager 920 may support wireless communications at a second wireless device in accordance with examples as disclosed herein. The signal transmitter 940 may be configured as or otherwise support a means for transmitting, using one or more antenna elements associated with the second wireless device, one or more signals associated with a set of orbital angular momentum modes via reflection by a set of antenna elements of an IRS. The feedback message receiver 945 may be configured as or otherwise support a means for receiving a feedback message from a first wireless device based on the set of orbital angular momentum modes, the feedback message indicating one or more parameter adjustments for subsequent orbital angular momentum communications between the first wireless device and the second wireless device, the one or more parameter adjustments based on one or more measurements associated with the set of orbital angular momentum modes. The communication component 935 may be configured as or otherwise support a means for communicating with the first wireless device according to the one or more parameter adjustments based on the feedback message.

Figure 10:
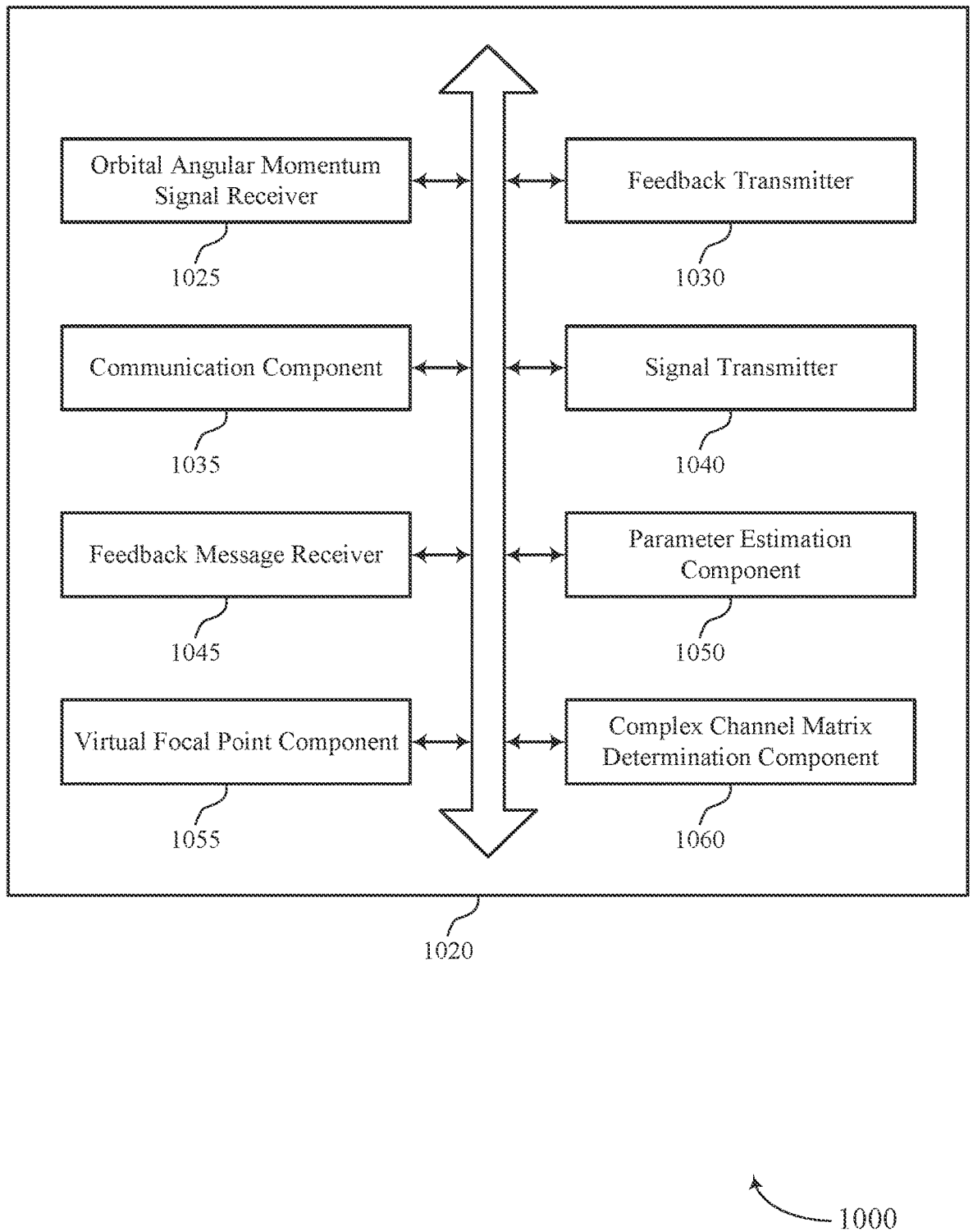
FIG. 10 shows a block diagram of a communications manager that supports orbital angular momentum transmission and reception using intelligent reflecting surfaces in accordance with aspects of the present disclosure.

FIG. 10 shows a block diagram 1000 of a communications manager 1020 that supports orbital angular momentum transmission and reception using intelligent reflecting surfaces in accordance with aspects of the present disclosure. The communications manager 1020 may be an example of aspects of a communications manager 820, a communications manager 920, or both, as described herein. The communications manager 1020, or various components thereof, may be an example of means for performing various aspects of orbital angular momentum transmission and reception using intelligent reflecting surfaces as described herein. For example, the communications manager 1020 may include an orbital angular momentum signal receiver 1025, a feedback transmitter 1030, a communication component 1035, a signal transmitter 1040, a feedback message receiver 1045, a parameter estimation component 1050, a virtual focal point component 1055, a complex channel matrix determination component 1060, or any combination thereof. Each of these components may communicate, directly or indirectly, with one another (e.g., via one or more buses).

The communications manager 1020 may support wireless communications at a first wireless device in accordance with examples as disclosed herein. The orbital angular momentum signal receiver 1025 may be configured as or otherwise support a means for receiving, using one or more antenna elements associated with the first wireless device, a set of orbital angular momentum signals via a set of antenna elements of an IRS. The feedback transmitter 1030 may be configured as or otherwise support a means for transmitting a feedback message based on the set of orbital angular momentum signals, the feedback message indicating one or more parameter adjustments for subsequent orbital angular momentum communications between the first wireless device and a second wireless device, the one or more parameter adjustments based on one or more measurements associated with the set of orbital angular momentum signals by the first wireless device. The communication component 1035 may be configured as or otherwise support a means for communicating with the second wireless device according to the one or more parameter adjustments based on the feedback message.

In some examples, the orbital angular momentum signal receiver 1025 may be configured as or otherwise support a means for receiving an orbital angular momentum signal of the set of orbital angular momentum signals, the orbital angular momentum signal corresponding to a mode associated with the set of orbital angular momentum signals. In some examples, the parameter estimation component 1050 may be configured as or otherwise support a means for estimating, from the orbital angular momentum signal, a set of parameters corresponding to the mode and the set of antenna elements of the IRS, where the one or more parameter adjustments is based on the estimating.

In some examples, the set of parameters corresponds to a power density and impinging phase pattern.

In some examples, to support estimating the set of parameters, the parameter estimation component 1050 may be configured as or otherwise support a means for estimating, from the orbital angular momentum signal, a coarse power density mapping associated with the set of antenna elements of the IRS. In some examples, to support estimating the set of parameters, the virtual focal point component 1055 may be configured as or otherwise support a means for assigning, to the set of antenna elements of the IRS, one or more subareas, each subarea comprising one or more antenna elements of the IRS, wherein each subarea comprises one or more virtual focal points, the one or more virtual focal points based at least in part on the set of antenna elements, the mode, or both. In some examples, to support estimating the set of parameters, the parameter estimation component 1050 may be configured as or otherwise support a means for determining, via an estimation procedure, one or more boundaries associated with the mode based on the mode and the one or more antenna elements, the one or more boundaries corresponding to the set of antenna elements of the IRS.

In some examples, the estimation procedure corresponds to an orthogonal cover code-based channel estimation procedure, activating one or more subareas, or both.

In some examples, the parameter estimation component 1050 may be configured as or otherwise support a means for estimating, from the orbital angular momentum signal, a coarse impinging signal phase mapping associated with the set of antenna elements of the IRS based on the one or more boundaries associated with the mode. In some examples, the parameter estimation component 1050 may be configured as or otherwise support a means for assigning, to the one or more boundaries, a phase mapping, the phase mapping corresponding to a phase variation associated with the one or more boundaries.

In some examples, the phase mapping corresponds to a uniformly distributed phase mapping.

In some examples, the phase mapping corresponds to a swirled phase mapping.

In some examples, the parameter estimation component 1050 may be configured as or otherwise support a means for determining, for a set of segments of a surface associated with the one or more boundaries, a set of surface phases, the set of segments being associated with the set of antenna elements of the IRS, the mode, and a set of antenna elements of the first wireless device. In some examples, the feedback transmitter 1030 may be configured as or otherwise support a means for transmitting, via the feedback message, the set of surface phases, the set of surface phases associated with the set of antenna elements of the IRS, the mode, and the set of antenna elements of the first wireless device. In some examples, the orbital angular momentum signal receiver 1025 may be configured as or otherwise support a means for receiving, at the set of antenna elements of the first wireless device, a beamformed orbital angular momentum signal based on the set of antenna elements of the IRS, the feedback message, and the mode.

In some examples, the parameter estimation component 1050 may be configured as or otherwise support a means for determining, based on receiving the beamformed orbital angular momentum signal, one or more equalization factors associated with one or more discrete Fourier transform vectors, the one or more discrete Fourier transform vectors being associated with the mode.

In some examples, the parameter estimation component 1050 may be configured as or otherwise support a means for determining, from the set of segments, a second set of segments, where the second set of segments is based on a swirl pattern associated with the mode. In some examples, the parameter estimation component 1050 may be configured as or otherwise support a means for estimating, via the second set of segments, a swirl surface phase mapping based on the swirl pattern associated with the mode.

In some examples, the parameter estimation component 1050 may be configured as or otherwise support a means for determining a refined phase mapping, a refined power mapping, or both, based on receiving the beamformed orbital angular momentum signal.

In some examples, the orbital angular momentum signal receiver 1025 may be configured as or otherwise support a means for receiving a set of beamformed orbital angular momentum signals corresponding to the set of orbital angular momentum signals, each beamformed orbital angular momentum signal of the set of beamformed orbital angular momentum signals being associated with a mapping between a set of antenna elements of the IRS and a set of antenna elements of the first wireless device, one or more boundaries, and a mode. In some examples, the feedback transmitter 1030 may be configured as or otherwise support a means for transmitting a second feedback message based on the set of beamformed orbital angular momentum signals, the second feedback message indicating a second set of parameter adjustments, the second set of parameter adjustments based on an overlap between the one or more boundaries. In some examples, the communication component 1035 may be configured as or otherwise support a means for communicating with the second wireless device according to the second set of parameter adjustments based on the second feedback message.

In some examples, the second set of parameter adjustments includes an average of overlapping boundaries, an average of gaps between boundaries, or both.

In some examples, the feedback transmitter 1030 may be configured as or otherwise support a means for transmitting, in the second feedback message, one or more incremental adjustments to surface phases associated with the set of beamformed orbital angular momentum signals. In some examples, the parameter estimation component 1050 may be configured as or otherwise support a means for determining the overlap between one or more boundaries associated with the set of beamformed orbital angular momentum signals based on the one or more incremental adjustments.

In some examples, the complex channel matrix determination component 1060 may be configured as or otherwise support a means for determining a complex channel matrix associated with the set of beamformed orbital angular momentum signals based on the one or more incremental adjustments, where the complex channel matrix includes channel coefficients associated with the set of beamformed orbital angular momentum signals.

In some examples, the one or more incremental adjustments is based on an online gradient-based procedure.

In some examples, the feedback transmitter 1030 may be configured as or otherwise support a means for transmitting a third feedback message based on communicating with the second wireless device according to the second set of parameter adjustments, the third feedback message indicating one or more modem-level precoder values.

In some examples, the one or more modem-level precoder values is based on one or more codebooks.

Additionally or alternatively, the communications manager 1020 may support wireless communications at a second wireless device in accordance with examples as disclosed herein. The signal transmitter 1040 may be configured as or otherwise support a means for transmitting, using one or more antenna elements associated with the second wireless device, one or more signals associated with a set of orbital angular momentum modes via reflection by a set of antenna elements of an IRS. The feedback message receiver 1045 may be configured as or otherwise support a means for receiving a feedback message from a first wireless device based on the set of orbital angular momentum modes, the feedback message indicating one or more parameter adjustments for subsequent orbital angular momentum communications between the first wireless device and the second wireless device, the one or more parameter adjustments based on one or more measurements associated with the set of orbital angular momentum modes. In some examples, the communication component 1035 may be configured as or otherwise support a means for communicating with the first wireless device according to the one or more parameter adjustments based on the feedback message.

In some examples, to support transmitting the one or more signals, the signal transmitter 1040 may be configured as or otherwise support a means for transmitting a first beamformed signal associated with a first mode of the set of orbital angular momentum modes. In some examples, to support transmitting the one or more signals, the signal transmitter 1040 may be configured as or otherwise support a means for transmitting a second beamformed signal associated with a second mode of the set of orbital angular momentum modes via a second set of antenna elements of the IRS using the one or more antenna elements.

In some examples, the first and second modes are different.

In some examples, the first and second modes are associated with non-overlapping beams impinging on the IRS associated with the second wireless device.

In some examples, to support receiving the feedback message, the feedback message receiver 1045 may be configured as or otherwise support a means for receiving, via the feedback message, an indication of a precoder, an indication of major errors, or both, the indication of the precoder and the indication of major errors associated with one or more sets of antenna elements of the first wireless device and one or more modes of the set of orbital angular momentum modes.

In some examples, to support communicating with the first wireless device, the signal transmitter 1040 may be configured as or otherwise support a means for transmitting a beamformed orbital angular momentum signal based on the indication of the precoder, the indication of major errors, or both.

In some examples, receiving a third feedback message based on communicating with the first wireless device according to the second set of parameter adjustments, the third feedback message indicating one or more modem-level precoder values.

Figure 11:
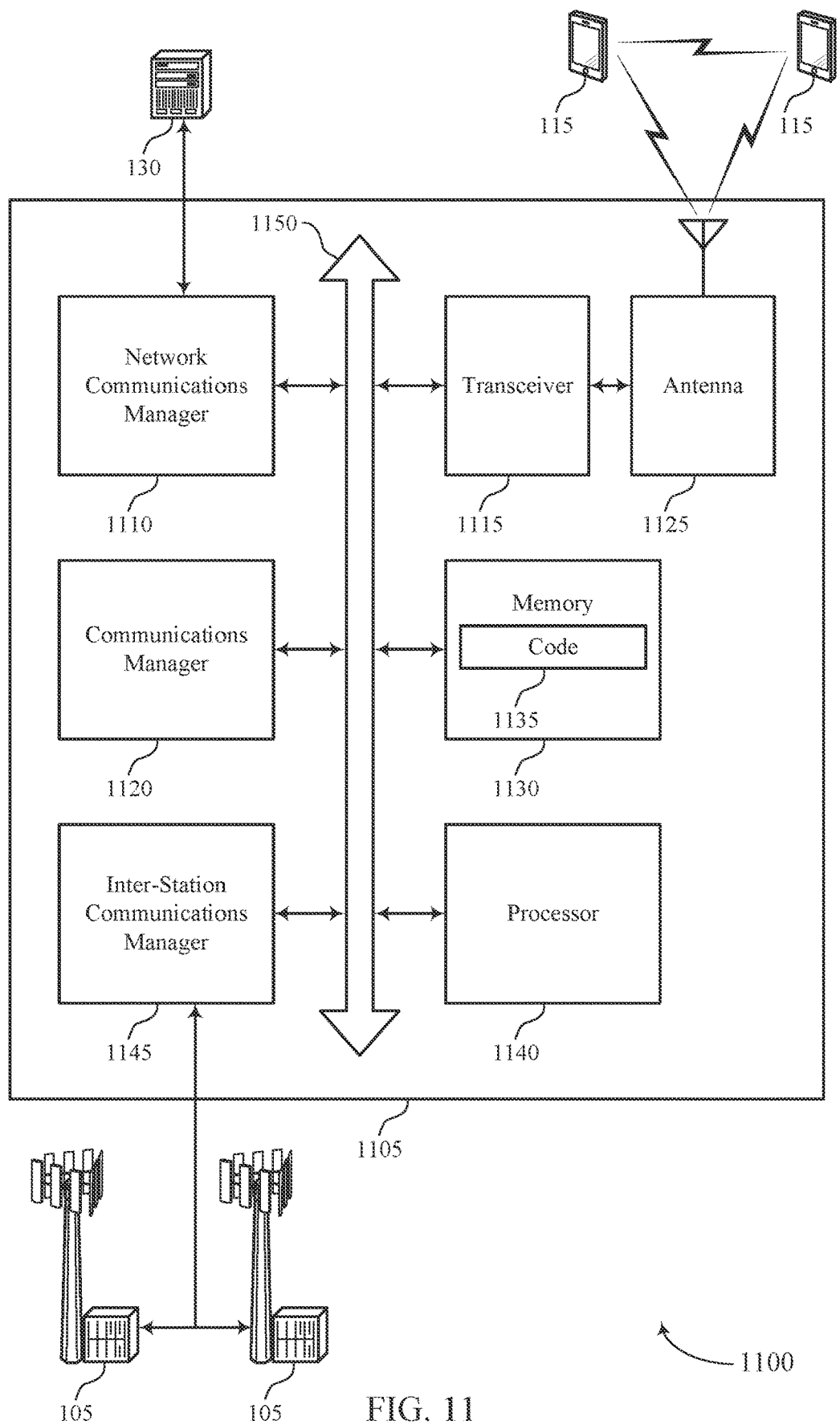
FIG. 11 shows a diagram of a system including a device that supports orbital angular momentum transmission and reception using intelligent reflecting surfaces in accordance with aspects of the present disclosure.

FIG. 11 shows a diagram of a system 1100 including a device 1105 that supports orbital angular momentum transmission and reception using intelligent reflecting surfaces in accordance with aspects of the present disclosure. The device 1105 may be an example of or include the components of a device 805, a device 905, or a wireless device as described herein. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random-access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting orbital angular momentum transmission and reception using intelligent reflecting surfaces). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communications at a first wireless device in accordance with examples as disclosed herein. For example, the communications manager 1120 may be configured as or otherwise support a means for receiving, using one or more antenna elements associated with the first wireless device, a set of orbital angular momentum signals via a set of antenna elements of an IRS. The communications manager 1120 may be configured as or otherwise support a means for transmitting a feedback message based on the set of orbital angular momentum signals, the feedback message indicating one or more parameter adjustments for subsequent orbital angular momentum communications between the first wireless device and a second wireless device, the one or more parameter adjustments based on one or more measurements associated with the set of orbital angular momentum signals by the first wireless device. The communications manager 1120 may be configured as or otherwise support a means for communicating with the second wireless device according to the one or more parameter adjustments based on the feedback message.

Additionally or alternatively, the communications manager 1120 may support wireless communications at a second wireless device in accordance with examples as disclosed herein. For example, the communications manager 1120 may be configured as or otherwise support a means for transmitting, using one or more antenna elements associated with the second wireless device, one or more signals associated with a set of orbital angular momentum modes via reflection by a set of antenna elements of an IRS. The communications manager 1120 may be configured as or otherwise support a means for receiving a feedback message from a first wireless device based on the set of orbital angular momentum modes, the feedback message indicating one or more parameter adjustments for subsequent orbital angular momentum communications between the first wireless device and the second wireless device, the one or more parameter adjustments based on one or more measurements associated with the set of orbital angular momentum modes. The communications manager 1120 may be configured as or otherwise support a means for communicating with the first wireless device according to the one or more parameter adjustments based on the feedback message.

By including or configuring the communications manager 1120 in accordance with examples as described herein, the device 1105 may support techniques for improved communication reliability more efficient utilization of communication resources, and improved coordination between devices by utilizing techniques to establish and utilize OAM modes for communications via one or more IRSs.

In some examples, the communications manager 1120 may be configured to perform various operations (e.g., receiving, monitoring, transmitting) using or otherwise in cooperation with the transceiver 1115, the one or more antennas 1125, or any combination thereof. For example, the communications manager 1120 may be configured to receive or transmit messages or other signaling as described herein via the transceiver 1115. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of orbital angular momentum transmission and reception using intelligent reflecting surfaces as described herein, or the processor 1140 and the memory 1130 may be otherwise configured to perform or support such operations.

Figure 12:
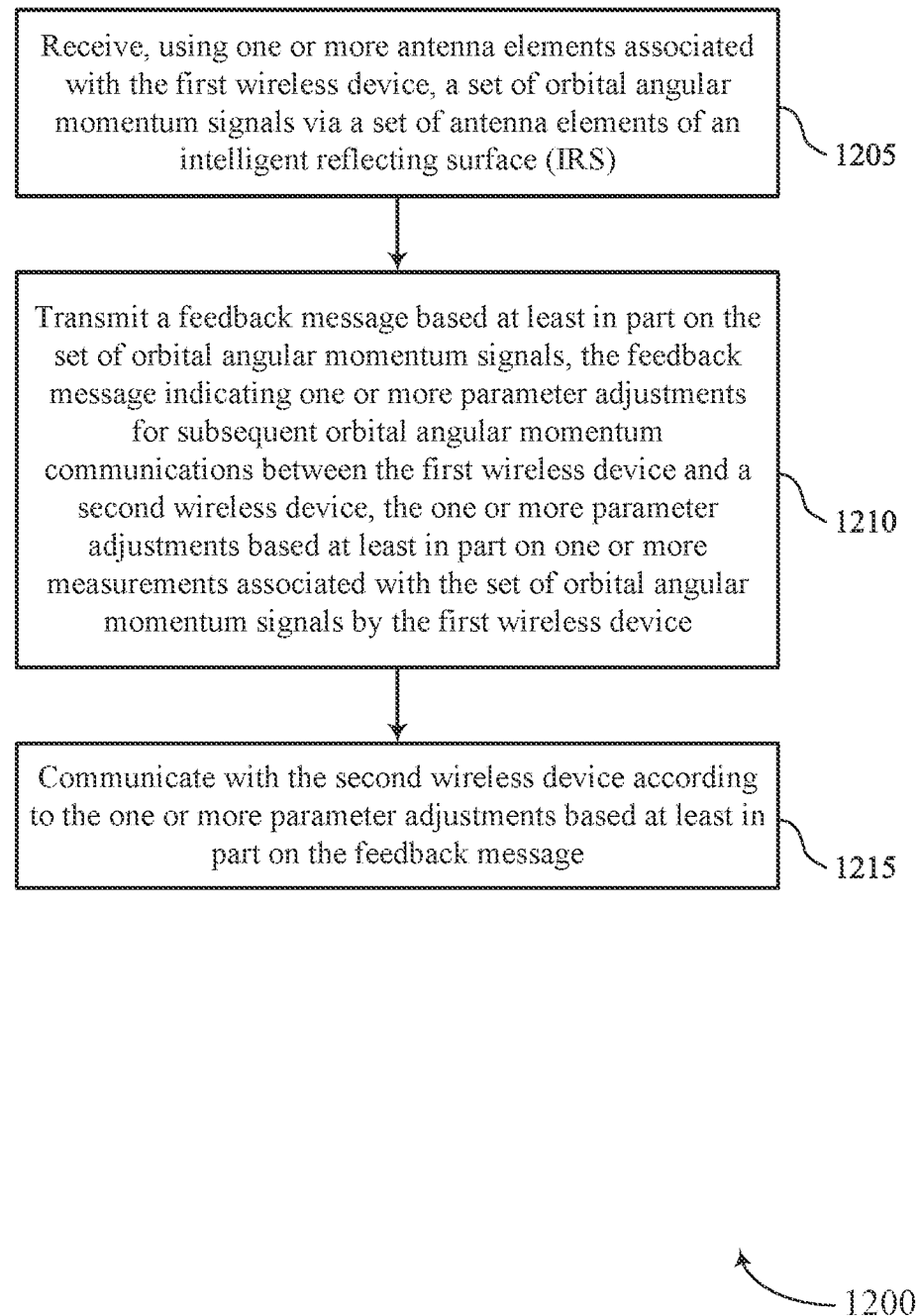
FIGS. 12 through 14 show flowcharts illustrating methods that support orbital angular momentum transmission and reception using intelligent reflecting surfaces in accordance with aspects of the present disclosure.

FIG. 12 shows a flowchart illustrating a method 1200 that supports orbital angular momentum transmission and reception using intelligent reflecting surfaces in accordance with aspects of the present disclosure. The operations of the method 1200 may be implemented by a wireless device or its components as described herein. For example, the operations of the method 1200 may be performed by a wireless device as described with reference to FIGS. 1 through 11. In some examples, a wireless device may execute a set of instructions to control the functional elements of the wireless device to perform the described functions. Additionally or alternatively, the wireless device may perform aspects of the described functions using special-purpose hardware.

At 1205, the method may include receiving, using one or more antenna elements associated with the first wireless device, a set of orbital angular momentum signals via a set of antenna elements of an IRS. The operations of 1205 may be performed in accordance with examples as disclosed herein. In some examples, aspects of the operations of 1205 may be performed by an orbital angular momentum signal receiver 1025 as described with reference to FIG. 10.

At 1210, the method may include transmitting a feedback message based on the set of orbital angular momentum signals, the feedback message indicating one or more parameter adjustments for subsequent orbital angular momentum communications between the first wireless device and a second wireless device, the one or more parameter adjustments based on one or more measurements associated with the set of orbital angular momentum signals by the first wireless device. The operations of 1210 may be performed in accordance with examples as disclosed herein. In some examples, aspects of the operations of 1210 may be performed by a feedback transmitter 1030 as described with reference to FIG. 10.

At 1215, the method may include communicating with the second wireless device according to the one or more parameter adjustments based on the feedback message. The operations of 1215 may be performed in accordance with examples as disclosed herein. In some examples, aspects of the operations of 1215 may be performed by a communication component 1035 as described with reference to FIG. 10.

Figure 13:
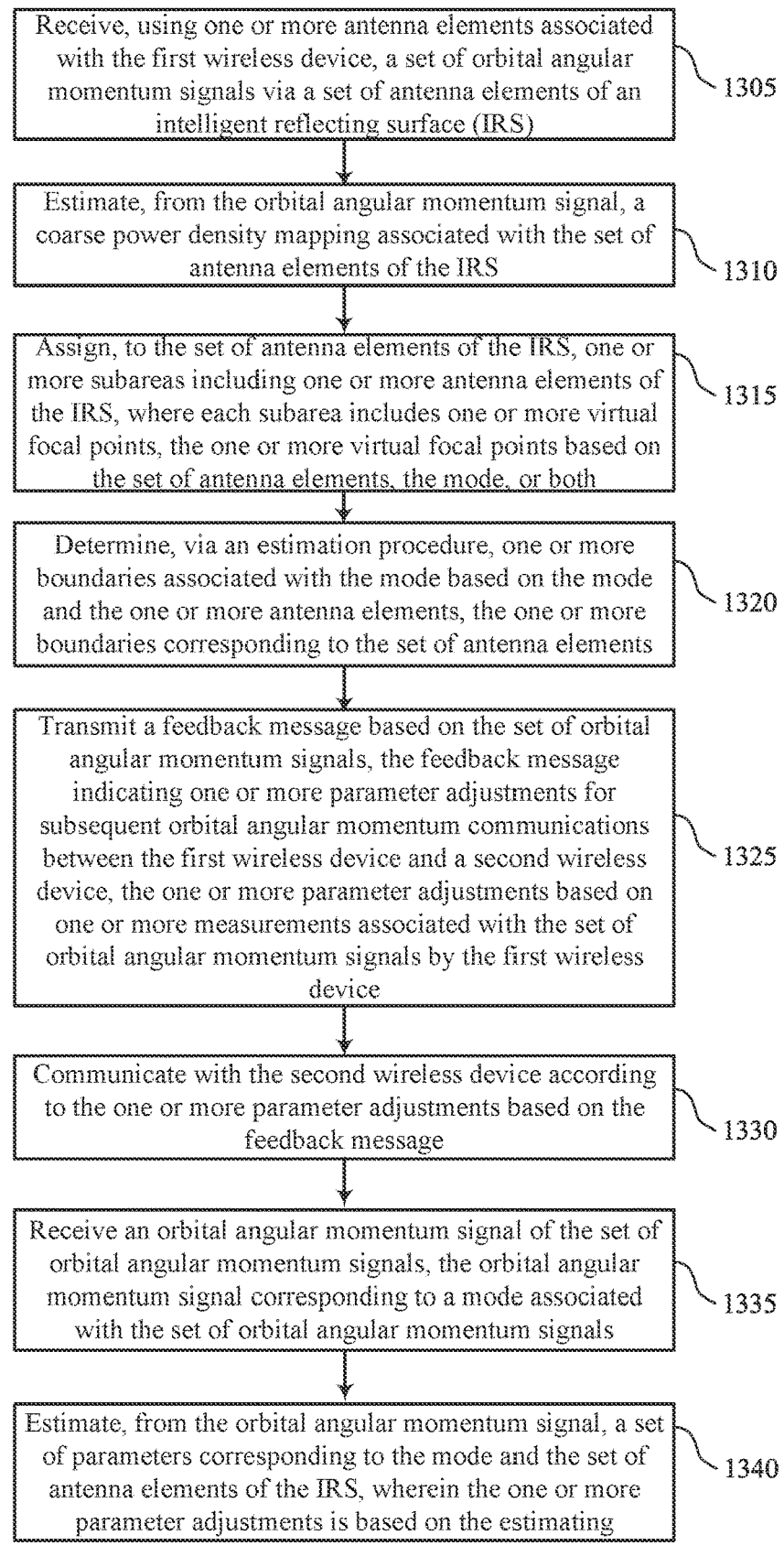

FIG. 13 shows a flowchart illustrating a method 1300 that supports orbital angular momentum transmission and reception using intelligent reflecting surfaces in accordance with aspects of the present disclosure. The operations of the method 1300 may be implemented by a wireless device or its components as described herein. For example, the operations of the method 1300 may be performed by a wireless device as described with reference to FIGS. 1 through 11. In some examples, a wireless device may execute a set of instructions to control the functional elements of the wireless device to perform the described functions. Additionally or alternatively, the wireless device may perform aspects of the described functions using special-purpose hardware.

At 1305, the method may include receiving, using one or more antenna elements associated with the first wireless device, a set of orbital angular momentum signals via a set of antenna elements of an IRS. The operations of 1305 may be performed in accordance with examples as disclosed herein. In some examples, aspects of the operations of 1305 may be performed by an orbital angular momentum signal receiver 1025 as described with reference to FIG. 10.

At 1310, the method may include estimating, from the orbital angular momentum signal, a coarse power density mapping associated with the set of antenna elements of the IRS. The operations of 1310 may be performed in accordance with examples as disclosed herein. In some examples, aspects of the operations of 1310 may be performed by a parameter estimation component 1050 as described with reference to FIG. 10.

At 1315, the method may include assigning, to the set of antenna elements of the IRS, one or more subareas, each subarea comprising one or more antenna elements of the IRS, wherein each subarea comprises one or more virtual focal points, the one or more virtual focal points based at least in part on the set of antenna elements, the mode, or both. The operations of 1315 may be performed in accordance with examples as disclosed herein. In some examples, aspects of the operations of 1315 may be performed by a virtual focal point component 1055 as described with reference to FIG. 10.

At 1320, the method may include determining, via an estimation procedure, one or more boundaries associated with the mode based on the mode and the one or more antenna elements, the one or more boundaries corresponding to the set of antenna elements. The operations of 1320 may be performed in accordance with examples as disclosed herein. In some examples, aspects of the operations of 1320 may be performed by a parameter estimation component 1050 as described with reference to FIG. 10.

At 1325, the method may include transmitting a feedback message based on the set of orbital angular momentum signals, the feedback message indicating one or more parameter adjustments for subsequent orbital angular momentum communications between the first wireless device and a second wireless device, the one or more parameter adjustments based on one or more measurements associated with the set of orbital angular momentum signals by the first wireless device. The operations of 1325 may be performed in accordance with examples as disclosed herein. In some examples, aspects of the operations of 1325 may be performed by a feedback transmitter 1030 as described with reference to FIG. 10.

At 1330, the method may include communicating with the second wireless device according to the one or more parameter adjustments based on the feedback message. The operations of 1330 may be performed in accordance with examples as disclosed herein. In some examples, aspects of the operations of 1330 may be performed by a communication component 1035 as described with reference to FIG. 10.

At 1335, the method may include receiving an orbital angular momentum signal of the set of orbital angular momentum signals, the orbital angular momentum signal corresponding to a mode associated with the set of orbital angular momentum signals. The operations of 1335 may be performed in accordance with examples as disclosed herein. In some examples, aspects of the operations of 1335 may be performed by an orbital angular momentum signal receiver 1025 as described with reference to FIG. 10.

At 1340, the method may include estimating, from the orbital angular momentum signal, a set of parameters corresponding to the mode and the set of antenna elements of the IRS, where the one or more parameter adjustments is based on the estimating. The operations of 1340 may be performed in accordance with examples as disclosed herein. In some examples, aspects of the operations of 1340 may be performed by a parameter estimation component 1050 as described with reference to FIG. 10.

Figure 14:
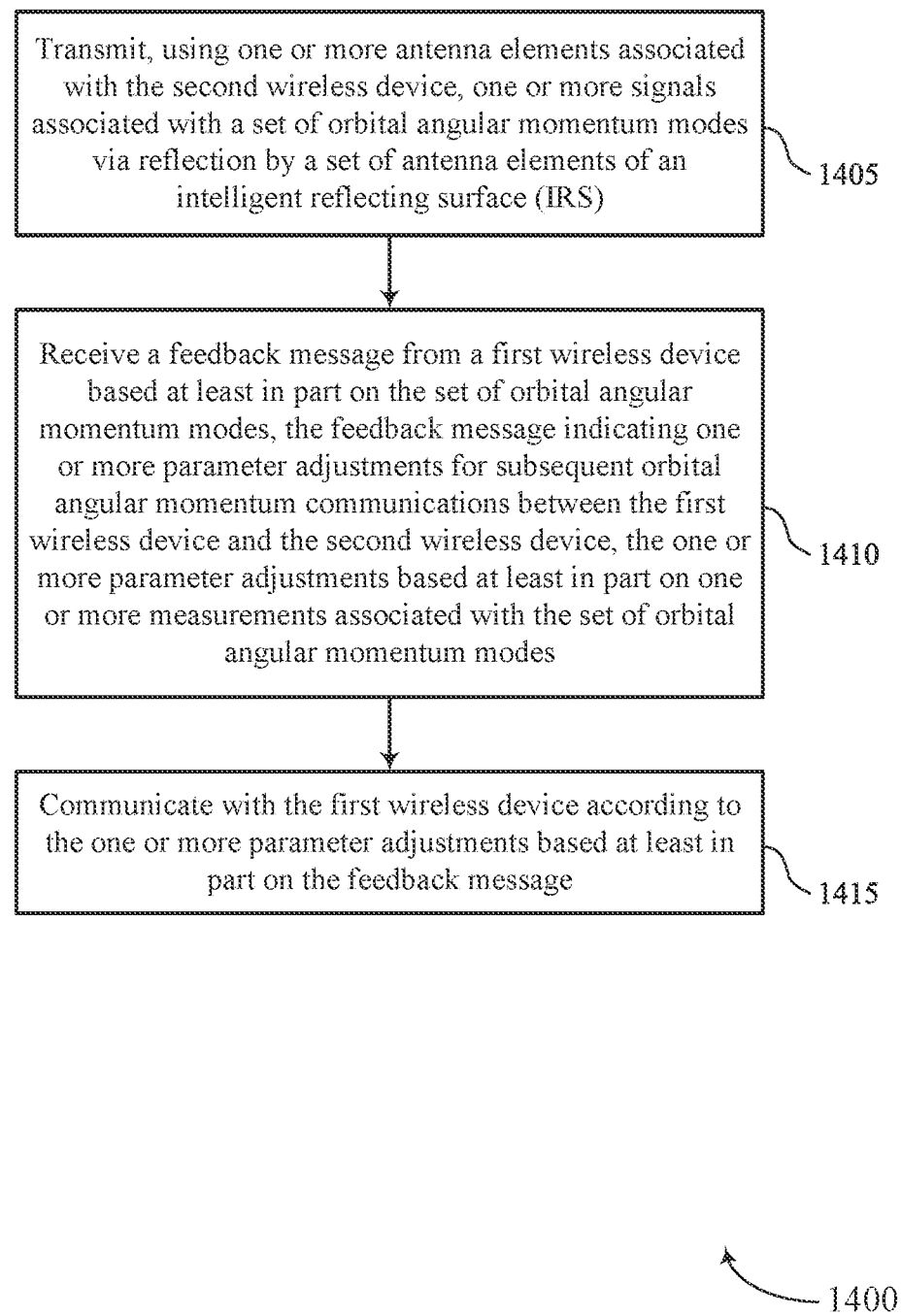

FIG. 14 shows a flowchart illustrating a method 1400 that supports orbital angular momentum transmission and reception using intelligent reflecting surfaces in accordance with aspects of the present disclosure. The operations of the method 1400 may be implemented by a wireless device or its components as described herein. For example, the operations of the method 1400 may be performed by a wireless device as described with reference to FIGS. 1 through 11. In some examples, a wireless device may execute a set of instructions to control the functional elements of the wireless device to perform the described functions. Additionally or alternatively, the wireless device may perform aspects of the described functions using special-purpose hardware.

At 1405, the method may include transmitting, using one or more antenna elements associated with the second wireless device, one or more signals associated with a set of orbital angular momentum modes via reflection by a set of antenna elements of an IRS. The operations of 1405 may be performed in accordance with examples as disclosed herein. In some examples, aspects of the operations of 1405 may be performed by a signal transmitter 1040 as described with reference to FIG. 10.

At 1410, the method may include receiving a feedback message from a first wireless device based on the set of orbital angular momentum modes, the feedback message indicating one or more parameter adjustments for subsequent orbital angular momentum communications between the first wireless device and the second wireless device, the one or more parameter adjustments based on one or more measurements associated with the set of orbital angular momentum modes. The operations of 1410 may be performed in accordance with examples as disclosed herein. In some examples, aspects of the operations of 1410 may be performed by a feedback message receiver 1045 as described with reference to FIG. 10.

At 1415, the method may include communicating with the first wireless device according to the one or more parameter adjustments based on the feedback message. The operations of 1415 may be performed in accordance with examples as disclosed herein. In some examples, aspects of the operations of 1415 may be performed by a communication component 1035 as described with reference to FIG. 10.

The following provides an overview of aspects of the present disclosure:

Aspect 1: A method for wireless communications at a first wireless device, comprising: receiving, using one or more antenna elements associated with the first wireless device, a set of orbital angular momentum signals via a set of antenna elements of an IRS; transmitting a feedback message based at least in part on the set of orbital angular momentum signals, the feedback message indicating one or more parameter adjustments for subsequent orbital angular momentum communications between the first wireless device and a second wireless device, the one or more parameter adjustments based at least in part on one or more measurements associated with the set of orbital angular momentum signals by the first wireless device; and communicating with the second wireless device according to the one or more parameter adjustments based at least in part on the feedback message.

Aspect 2: The method of aspect 1, further comprising: receiving an orbital angular momentum signal of the set of orbital angular momentum signals, the orbital angular momentum signal corresponding to a mode associated with the set of orbital angular momentum signals; and estimating, from the orbital angular momentum signal, a set of parameters corresponding to the mode and the set of antenna elements of the IRS, wherein the one or more parameter adjustments is based at least in part on the estimating.

Aspect 3: The method of aspect 2, wherein the set of parameters corresponds to a power density and an impinging phase pattern.

Aspect 4: The method of any of aspects 2 through 3, wherein estimating the set of parameters comprises: estimating, from the orbital angular momentum signal, a coarse power density mapping associated with the set of antenna elements of the IRS; assigning, to the set of antenna elements of the IRS, one or more subareas, each subarea comprising one or more antenna elements of the IRS, wherein each subarea comprises one or more virtual focal points, the one or more virtual focal points based at least in part on the set of antenna elements, the mode, or both; and determining, via an estimation procedure, one or more boundaries associated with the mode based at least in part on the mode and the one or more antenna elements, the one or more boundaries corresponding to the set of antenna elements.

Aspect 5: The method of aspect 4, wherein the estimation procedure corresponds to an orthogonal cover code-based channel estimation procedure, activating one or more subareas, or both.

Aspect 6: The method of any of aspects 4 through 5, further comprising: estimating, from the orbital angular momentum signal, a coarse impinging signal phase mapping associated with the set of antenna elements of the IRS based at least in part on the one or more boundaries associated with the mode; and assigning, to the one or more boundaries, a phase mapping, the phase mapping corresponding to a phase variation associated with the one or more boundaries.

Aspect 7: The method of aspect 6, wherein the phase mapping corresponds to a uniformly distributed phase mapping.

Aspect 8: The method of any of aspects 6 through 7, wherein the phase mapping corresponds to a swirled phase mapping.

Aspect 9: The method of any of aspects 6 through 8, further comprising: determining, for a set of segments of a surface associated with the one or more boundaries, a set of surface phases, the set of segments being associated with the set of antenna elements, the mode, and a set of antenna elements of the first wireless device; transmitting, via the feedback message, the set of surface phases, the set of surface phases associated with the set of antenna elements, the mode, and the set of antenna elements of the first wireless device; and receiving, at the set of antenna elements of the first wireless device, a beamformed orbital angular momentum signal based at least in part on the set of antenna elements, the feedback message, and the mode.

Aspect 10: The method of aspect 9, further comprising: determining, based at least in part on receiving the beamformed orbital angular momentum signal, one or more equalization factors associated with one or more discrete Fourier transform vectors, the one or more discrete Fourier transform vectors being associated with the mode.

Aspect 11: The method of aspect 10, further comprising: determining, from the set of segments, a second set of segments, wherein the second set of segments is based at least in part on a swirl pattern associated with the mode; and estimating, via the second set of segments, a swirl surface phase mapping based at least in part on the swirl pattern associated with the mode.

Aspect 12: The method of any of aspects 9 through 11, further comprising: determining a refined phase mapping, a refined power mapping, or both, based at least in part on receiving the beamformed orbital angular momentum signal.

Aspect 13: The method of any of aspects 1 through 12, further comprising: receiving a set of beamformed orbital angular momentum signals corresponding to the set of orbital angular momentum signals, each beamformed orbital angular momentum signal of the set of beamformed orbital angular momentum signals being associated with a mapping between a set of antenna elements of the IRS and a set of antenna elements of the first wireless device, one or more boundaries, and a mode; transmitting a second feedback message based at least in part on the set of beamformed orbital angular momentum signals, the second feedback message indicating a second set of parameter adjustments, the second set of parameter adjustments based at least in part on an overlap between the one or more boundaries; and communicating with the second wireless device according to the second set of parameter adjustments based at least in part on the second feedback message.

Aspect 14: The method of aspect 13, wherein the second set of parameter adjustments comprises an average of overlapping boundaries, an average of gaps between boundaries, or both.

Aspect 15: The method of any of aspects 13 through 14, further comprising: transmitting, in the second feedback message, one or more incremental adjustments to surface phases associated with the set of beamformed orbital angular momentum signals; and determining the overlap between one or more boundaries associated with the set of beamformed orbital angular momentum signals based at least in part on the one or more incremental adjustments.

Aspect 16: The method of aspect 15, further comprising: determining a complex channel matrix associated with the set of beamformed orbital angular momentum signals based at least in part on the one or more incremental adjustments, wherein the complex channel matrix comprises channel coefficients associated with the set of beamformed orbital angular momentum signals.

Aspect 17: The method of any of aspects 15 through 16, wherein the one or more incremental adjustments is based at least in part on an online gradient-based procedure.

Aspect 18: The method of any of aspects 13 through 17, further comprising: transmitting a third feedback message based at least in part on communicating with the second wireless device according to the second set of parameter adjustments, the third feedback message indicating one or more modem-level precoder values.

Aspect 19: The method of aspect 18, wherein the one or more modem-level precoder values is based at least in part on one or more codebooks.

Aspect 20: A method for wireless communications at a second wireless device, comprising: transmitting, using one or more antenna elements associated with the second wireless device, one or more signals associated with a set of orbital angular momentum modes via reflection by a set of antenna elements of an IRS; receiving a feedback message from a first wireless device based at least in part on the set of orbital angular momentum modes, the feedback message indicating one or more parameter adjustments for subsequent orbital angular momentum communications between the first wireless device and the second wireless device, the one or more parameter adjustments based at least in part on one or more measurements associated with the set of orbital angular momentum modes; and communicating with the first wireless device according to the one or more parameter adjustments based at least in part on the feedback message.

Aspect 21: The method of aspect 20, wherein transmitting the one or more signals comprises: transmitting a first beamformed signal associated with a first mode of the set of orbital angular momentum modes; and transmitting a second beamformed signal associated with a second mode of the set of orbital angular momentum modes via a second set of antenna elements of the intelligent reflecting surface using the one or more antenna elements.

Aspect 22: The method of aspect 21, wherein the first and second modes are different.

Aspect 23: The method of any of aspects 21 through 22, wherein the first and second modes are associated with non-overlapping beams impinging on the IRS associated with the second wireless device.

Aspect 24: The method of any of aspects 20 through 23, wherein receiving the feedback message comprises: receiving, via the feedback message, an indication of a precoder, an indication of major errors, or both, the indication of the precoder and the indication of major errors associated with one or more sets of antenna elements of the first wireless device and one or more modes of the set of orbital angular momentum modes.

Aspect 25: The method of aspect 24, wherein communicating with the first wireless device comprises: transmitting a beamformed orbital angular momentum signal based at least in part on the indication of the precoder, the indication of major errors, or both.

Aspect 26: The method of any of aspects 24 through 25, wherein receiving a third feedback message based at least in part on communicating with the first wireless device according to the second set of parameter adjustments, the third feedback message indicating one or more modem-level precoder values.

Aspect 27: An apparatus comprising a memory, transceiver, and at least one processor of a first wireless device coupled with the memory and the transceiver, the at least one processor configured to cause the apparatus to perform a method of any of aspects 1 through 19.

Aspect 28: An apparatus for wireless communications at a first wireless device, comprising at least one means for performing a method of any of aspects 1 through 19.

Aspect 29: A non-transitory computer-readable medium storing code for wireless communications at a first wireless device, the code comprising instructions executable by a processor to perform a method of any of aspects 1 through 19.

Aspect 30: An apparatus comprising a memory, transceiver, and at least one processor of a second wireless device coupled with the memory and the transceiver, the at least one processor configured to cause the apparatus to perform a method of any of aspects 20 through 26.

Aspect 31: An apparatus for wireless communications at a second wireless device, comprising at least one means for performing a method of any of aspects 20 through 26.

Aspect 32: A non-transitory computer-readable medium storing code for wireless communications at a second wireless device, the code comprising instructions executable by a processor to perform a method of any of aspects 20 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first wireless device, comprising:
   receiving, using one or more antenna elements associated with the first wireless device, a set of orbital angular momentum signals via a set of antenna elements of an intelligent reflecting surface (IRS), wherein an orbital angular momentum signal of the set of orbital angular momentum signals corresponds to a mode associated with the set of orbital angular momentum signals;
   estimating, based at least in part on the orbital angular momentum signal, a set of parameters corresponding to the mode and the set of antenna elements of the IRS;
   transmitting a feedback message based at least in part on the set of orbital angular momentum signals, the feedback message indicating one or more parameter adjustments for subsequent orbital angular momentum communications, via the IRS, between the first wireless device and a second wireless device, the one or more parameter adjustments based at least in part on the estimating and one or more measurements associated with the set of orbital angular momentum signals by the first wireless device; and
   communicating with the second wireless device via the IRS according to the one or more parameter adjustments based at least in part on the feedback message.

2. The method of claim 1, wherein the estimated set of parameters corresponds to a power density and an impinging phase pattern.

3. The method of claim 1, wherein estimating the set of parameters comprises:
   estimating, based at least in part on the orbital angular momentum signal, a coarse power density mapping associated with the set of antenna elements of the IRS;
   assigning, to the set of antenna elements of the IRS, one or more subareas, each subarea comprising a subset of the set of antenna elements of the IRS, wherein each subarea comprises one or more virtual focal points, the one or more virtual focal points based at least in part on the set of antenna elements, the mode, or both; and
   determining, via an estimation procedure, one or more boundaries associated with the mode based at least in part on the mode and the subset of the set of antenna elements, the one or more boundaries corresponding to the set of antenna elements.

4. The method of claim 3, wherein the estimation procedure corresponds to an orthogonal cover code-based channel estimation procedure, activating the one or more subareas, or both.

5. The method of claim 3, further comprising:
estimating, based at least in part on the orbital angular momentum signal, a coarse impinging signal phase mapping associated with the set of antenna elements of the IRS based at least in part on the one or more boundaries associated with the mode; and
assigning, to the one or more boundaries, a phase mapping, the phase mapping corresponding to a phase variation associated with the one or more boundaries.

6. The method of claim 5, wherein the phase mapping corresponds to a uniformly distributed phase mapping.

7. The method of claim 5, wherein the phase mapping corresponds to a swirled phase mapping.

8. The method of claim 5, further comprising:
determining, for a set of segments of a surface associated with the one or more boundaries, a set of surface phases, the set of segments being associated with the set of antenna elements of the IRS, the mode, and the subset of the one or more antenna elements associated with the first wireless device;
transmitting, via the feedback message, the set of surface phases, the set of surface phases associated with the set of antenna elements of the IRS, the mode, and the subset of the one or more antenna elements associated with the first wireless device; and
receiving, at the subset of the one or more antenna elements associated with the first wireless device, a beamformed orbital angular momentum signal based at least in part on the set of antenna elements of the IRS, the feedback message, and the mode.

9. The method of claim 8, further comprising:
determining, based at least in part on receiving the beamformed orbital angular momentum signal, one or more equalization factors associated with one or more discrete Fourier transform vectors, the one or more discrete Fourier transform vectors being associated with the mode.

10. The method of claim 9, further comprising:
determining, from the set of segments, a second set of segments, wherein the second set of segments is based at least in part on a swirl pattern associated with the mode; and
estimating, via the second set of segments, a swirl surface phase mapping based at least in part on the swirl pattern associated with the mode.

11. The method of claim 8, further comprising:
determining a refined phase mapping, a refined power mapping, or both, based at least in part on receiving the beamformed orbital angular momentum signal.

12. The method of claim 1, further comprising:
receiving a set of beamformed orbital angular momentum signals corresponding to the set of orbital angular momentum signals, each beamformed orbital angular momentum signal of the set of beamformed orbital angular momentum signals being associated with one or more boundaries and with a mapping between the set of antenna elements of the IRS and the one or more antenna elements associated with the first wireless device;

transmitting a second feedback message based at least in part on the set of beamformed orbital angular momentum signals, the second feedback message indicating a second set of parameter adjustments, the second set of parameter adjustments based at least in part on an overlap between the one or more boundaries; and
communicating with the second wireless device according to the second set of parameter adjustments based at least in part on the second feedback message.

13. The method of claim 12, wherein the second set of parameter adjustments comprises an average of overlapping boundaries, an average of gaps between boundaries, or both.

14. The method of claim 12, further comprising:
transmitting, in the second feedback message, one or more incremental adjustments to surface phases associated with the set of beamformed orbital angular momentum signals; and
determining the overlap between boundaries associated with the set of beamformed orbital angular momentum signals based at least in part on the one or more incremental adjustments.

15. The method of claim 14, further comprising:
determining a complex channel matrix associated with the set of beamformed orbital angular momentum signals based at least in part on the one or more incremental adjustments, wherein the complex channel matrix comprises channel coefficients associated with the set of beamformed orbital angular momentum signals.

16. The method of claim 14, wherein the one or more incremental adjustments are based at least in part on an online gradient-based procedure.

17. The method of claim 12, further comprising:
transmitting a third feedback message based at least in part on communicating with the second wireless device according to the second set of parameter adjustments, the third feedback message indicating one or more modem-level precoder values.

18. The method of claim 17, wherein the one or more modem-level precoder values is based at least in part on one or more codebooks.

19. A method for wireless communications at a second wireless device, comprising:
transmitting, using one or more antenna elements associated with the second wireless device, one or more signals associated with a set of orbital angular momentum modes, the one or more signals comprising a first beamformed signal associated with a first mode of the set of orbital angular momentum modes and reflection by a first set of antenna elements of an intelligent reflecting surface (IRS), and the one or more signals further comprising a second beamformed signal associated with a second mode of the set of orbital angular momentum modes and reflection by a second set of antenna elements of the IRS;
receiving a feedback message from a first wireless device based at least in part on the set of orbital angular momentum modes, the feedback message indicating one or more parameter adjustments for subsequent orbital angular momentum communications, via the IRS, between the first wireless device and the second wireless device, the one or more parameter adjustments based at least in part on one or more measurements associated with the set of orbital angular momentum modes; and
communicating with the first wireless device via the IRS according to the one or more parameter adjustments based at least in part on the feedback message.

20. The method of claim 19, wherein the first mode and second mode are different.

21. The method of claim 19, wherein the first mode and second mode are associated with non-overlapping beams impinging on the IRS associated with the second wireless device.

22. The method of claim 19, wherein receiving the feedback message comprises:
receiving, via the feedback message, an indication of a precoder, an indication of major errors, or both, the indication of the precoder and the indication of major errors associated with one or more sets of antenna elements of the first wireless device and one or more modes of the set of orbital angular momentum modes.

23. The method of claim 22, wherein communicating with the first wireless device comprises:
transmitting a beamformed orbital angular momentum signal based at least in part on the indication of the precoder, the indication of major errors, or both.

24. The method of claim 22, further comprising:
receiving a second feedback message based at least in part on communicating with the first wireless device according to a second set of parameter adjustments, the second feedback message indicating one or more modem-level precoder values.

25. An apparatus for wireless communications at a first wireless device, comprising:
memory;
a transceiver; and
at least one processor of the first wireless device, the at least one processor coupled with the memory and the transceiver, and the at least one processor configured to cause the apparatus to:
receive, using one or more antenna elements associated with the first wireless device, a set of orbital angular momentum signals via a set of antenna elements of an intelligent reflecting surface (IRS), wherein an orbital angular momentum signal of the set of orbital angular momentum signals corresponds to a mode associated with the set of orbital angular momentum signals;
estimate, based at least in part on the orbital angular momentum signal, a set of parameters corresponding to the mode and the set of antenna elements of the IRS;
transmit a feedback message based at least in part on the set of orbital angular momentum signals, the feedback message indicating one or more parameter adjustments for subsequent orbital angular momentum communications, via the IRS, between the first wireless device and a second wireless device, the one or more parameter adjustments based at least in part on the estimating and one or more measurements associated with the set of orbital angular momentum signals by the first wireless device; and
communicate with the second wireless device via the IRS according to the one or more parameter adjustments based at least in part on the feedback message.

26. An apparatus for wireless communications at a second wireless device, comprising:
memory;
a transceiver; and
at least one processor of the second wireless device, the at least one processor coupled with the memory and the transceiver, and the at least one processor configured to cause the apparatus to:
transmit, using one or more antenna elements associated with the second wireless device, one or more signals associated with a set of orbital angular momentum modes, the one or more signals comprising a first beamformed signal associated with a first mode of the set of orbital angular momentum modes and reflection by a first set of antenna elements of an intelligent reflecting surface (IRS), and the one or more signals further comprising a second beamformed signal associated with a second mode of the set of orbital angular momentum modes and reflection by a second set of antenna elements of the IRS;
receive a feedback message from a first wireless device based at least in part on the set of orbital angular momentum modes, the feedback message indicating one or more parameter adjustments for subsequent orbital angular momentum communications, via the IRS, between the first wireless device and the second wireless device, the one or more parameter adjustments based at least in part on one or more measurements associated with the set of orbital angular momentum modes; and
communicate with the first wireless device via the IRS according to the one or more parameter adjustments based at least in part on the feedback message.

* * * * *